(12) United States Patent
Kawamura et al.

(10) Patent No.: US 8,705,801 B2
(45) Date of Patent: Apr. 22, 2014

(54) DISTANCE ESTIMATION DEVICE, DISTANCE ESTIMATION METHOD, INTEGRATED CIRCUIT, AND COMPUTER PROGRAM

(75) Inventors: Takashi Kawamura, Kyoto (JP); Pongsak Lasang, Singapore (SG)

(73) Assignee: Panasonic Corporation, Osaka (JP)

( * ) Notice: Subject to any disclaimer, the term of this patent is extended or adjusted under 35 U.S.C. 154(b) by 56 days.

(21) Appl. No.: 13/390,849

(22) PCT Filed: Jun. 17, 2011

(86) PCT No.: PCT/JP2011/003478
§ 371 (c)(1),
(2), (4) Date: Feb. 16, 2012

(87) PCT Pub. No.: WO2011/158515
PCT Pub. Date: Dec. 22, 2011

(65) Prior Publication Data
US 2012/0148109 A1    Jun. 14, 2012

(30) Foreign Application Priority Data
Jun. 17, 2012 (JP) .................... 2010-138785

(51) Int. Cl.
*G06K 9/00* (2006.01)

(52) U.S. Cl.
USPC ........................................ 382/106

(58) Field of Classification Search
None
See application file for complete search history.

(56) References Cited

U.S. PATENT DOCUMENTS

| 7,616,885 B2 | 11/2009 | Chen et al. | |
|---|---|---|---|
| 7,929,801 B2 * | 4/2011 | Nakamura et al. | 382/285 |
| 8,311,362 B2 * | 11/2012 | Tamaru | 382/275 |
| 2007/0019883 A1 * | 1/2007 | Wong et al. | 382/276 |
| 2007/0189750 A1 * | 8/2007 | Wong et al. | 396/121 |
| 2010/0118142 A1 | 5/2010 | Ohsawa | |

FOREIGN PATENT DOCUMENTS

JP    2003-269917    9/2003

(Continued)

OTHER PUBLICATIONS

Mark Antunes, Michael Trachtenberg, Gabriel Thomas, Tina Shoa, Image Analysis and Recognition, Lecture Notes in Computer Science vol. 3656, 2005, pp. 174-181 All-in-Focus Imaging Using a Series of Images on Different Focal Planes. Available online at: http://link.springer.com/chapter/10.1007%2F11559573_22#.*

(Continued)

*Primary Examiner* — Tahmina Ansari
(74) *Attorney, Agent, or Firm* — Wenderoth, Lind & Ponack, LLP

(57) ABSTRACT

A distance estimation device (1*x*) prevents the variation in distance estimation accuracy that has been a problem in distance estimation performed using an all-in-focus image and an arbitrary-focal-depth image. The distance estimation device can estimate a focal distance of any subject with a high degree of accuracy, and includes: a first generation unit (10*w*) generating a first distance map indicating a focal depth determined from an all-in-focus image and a first focal-depth image; a second generation unit (11*w*) generating a second distance map indicating a focal depth determined from the all-in-focus image and a second focal-depth image; and a distance map synthesis unit (14) synthesizing the generated first distance map and the generated second distance map to generate a synthetic distance map.

11 Claims, 12 Drawing Sheets

(56) References Cited

FOREIGN PATENT DOCUMENTS

| JP | 2007-139894 | 6/2007 |
| JP | 2010-2233 | 1/2010 |
| JP | 2010-39448 | 2/2010 |
| JP | 2010-66156 | 3/2010 |
| JP | 2010-121955 | 6/2010 |
| WO | WO 2011/158515 | * 12/2011 |

OTHER PUBLICATIONS

Chen et al., Depth map generation based on depth from focus, IEEE Conference Proceedings: Electronic Devices, Systems and Applications (ICEDSA), 2010 Intl Conf on Publisher: IEEE, Date: Apr. 11-14, 2010, pp. 59-63. Available online at: http://ieeexplore.ieee.org/stamp/stamp.jsp?tp=&arnumber=5503103.*

International Search Report issued Sep. 6, 2011 in International (PCT) Application No. PCT/JP2011/003478.

A.P. Pentland, "*A New Sense for Depth of Field*", IEEE Trans. PAMI, vol. 9, No. 4, pp. 523-531 (Jul. 1987).

M. Subbarao and G. Surya, "*Depth from Defocus: A Spatial Domain Approach*", International Journal of Computer Vision, vol. 13, No. 3 (Dec. 1994).

M. Watanabe and S.K. Nayar, "*Minimal Operator Set for Passive Depth from Defocus*", Proc. of IEEE Conf. Computer Vision and Pattern Recognition, pp. 431-438 (Jun. 1996).

Shinsaku Hiura and Takashi Matsuyama, "*Multi-Focus Range Finder with Coded Aperture*", the Institute of Electronics, Information and Communication Engineers Transactions, D-II vol. J82-D-II, No. 11, pp. 1912-1920 (Nov. 1999), with partial English translation.

A. Levin, R. Fergus, F. Durand and W.T. Freeman, "*Image and Depth from a Conventional Camera with a Coded Aperture*", ACM Transactions on Graphics, vol. 26, No. 3, Article 70, 70-1-70-9 (Jul. 2007).

C. Zhou, S. Lin and S. Nayar, "*Coded Aperture Pairs for Depth from Defocus*", IEEE International Conference on Computer Vision (ICCV) Sensing II (Sep.-Oct. 2009).

E. Wong, "*A New Method for Creating a Depth Map for Camera Auto Focus Using an All in Focus Picture and 2D Scale Space Matching*", Acoustics, Speech and Signal Processing, ICASSP 2006 Proceedings, IEEE International Conference, vol. 3, III, pp. 1184-1187 (May 2006).

E.R. Dowski and W.T. Cathey, "*Extended depth of field through wave-front coding*", Applied Optics, vol. 34, No. 11, pp. 1859-1866 (Apr. 1995).

H. Nagahara, S.Kuthirummal, C. Zhou and S. Nayar, "*Flexible Depth of Field Photography*", European Conference on Computer Vision (ECCV), Oct. 16th, Morning Session 2: Computational Photography (Oct. 2008).

C. Tisse, H.P. Nguyen, R. Tessieres, M. Pyanet and F. Guichard, "*Extended depth-of-field (EDoF) using sharpness transport across colour channels*", Optical Engineering + Applications, Part of SPIE Optics + Photonics, Session 1—Imaging in the Optical Design Process: Depth of Field (Aug. 2008).

W. Chi and N. George, "*Computational imaging with the logarithmic asphere: theory*", Optical Society of America, vol. 20, No. 12, (Dec. 2003).

* cited by examiner

DISTANCE ESTIMATION DEVICE, DISTANCE ESTIMATION METHOD, INTEGRATED CIRCUIT, AND COMPUTER PROGRAM

TECHNICAL FIELD

The present invention relates to a device and a method for estimating a distance to each subject included in an image obtained in moving image capture or continuous still image capture.

BACKGROUND ART

In general, a distance estimation method based on a sensing technology is roughly divided into the following two types.

One is an active sensing method. Examples of the active sensing method include a time-of-flight method using a laser or ultrasound, a confocal method commonly used for a microscope or the like, and an illumination stereo method using plural light sources.

The other is a passive sensing method. Examples of the passive sensing method include: a method whereby stereo images are captured and a distance is estimated from a difference between positions of a subject included in the captured images; and a focusing method using a difference in lens focal point based on only one captured image.

The focusing method is a technique used mainly for implementing an autofocus (referred to as "AF" hereafter) function of a camera. Examples of the focusing method include: a depth-from-focus (DFF) method used for, for example, a contrast AF function of a compact digital camera; a pupil-division phase-difference detection method used for an AF function of a single-lens reflex camera; and a depth-from-defocus (DFD) method.

By the DFF method, a contrast at one point included in an image is calculated, and focus is gradually changed. Then, when it is determined that the image is closely in focus, the focus change is stopped and a distance is thus determined.

When this DFF method is used, the focus change needs to be performed sequentially until the image comes into focus and, also, this method needs to be performed on all pixels in the image. For this reason, it takes significant time for distance measurement. In other words, this method is not suitable for distance measurement when the subject is moving.

A distance to a specific subject can be measured according to the method using the AF function as described above. However, when distance estimation is performed on all the pixels included in the image, a great number of images having different focal positions need to be necessarily captured. More specifically, there is a disadvantage that an image in focus needs to be selected from among the captured images for each of the pixels to estimate the distance.

With the pupil-division phase-difference detection method, a distance can be estimated directly by measuring a spacing between image formations performed by phase-difference detection sensors, and it does not take time to estimate the distance. However, it is impossible to arrange the phase-difference detection sensors corresponding to all the pixels included in the image. On this account, the distance estimation can be performed only for a predetermined point in the image. Moreover, the size of mechanism to implement this function is inevitably larger as compared with the cases of using the other methods.

With the DFD method, two images having different focal positions are captured, and a focal distance is calculated directly from the images and a blur parameter of a lens (see Non Patent Literatures 1 and 2, for example).

Here, the blur parameter represents a value that indicates blurring included in luminance information and has a correlation with variance of a point spread function (PSF) of the lens.

The PSF represents spreading of light of when an ideal point image passes through an optical system, and is also referred to as a defocus characteristic.

As is the case with the aforementioned pupil-division to phase-difference detection method, the DFD method does not take time to estimate the distance and only minimal two images have to be captured. However, the blur parameter of the lens needs to be obtained in advance. It should be noted that a real blurred image includes blurring caused not only by the lens, but also by an aperture is of an image pickup device and by film characteristics. On account of this, the blurring caused in these ways need to be obtained and considered in advance.

The DFD method has a problem that the two images having different focal positions need to be captured with no difference in magnification. However, it often happens that a normal optical system is not designed in this way. To be more specific, it is necessary to adopt an image-side telecentric optical system (see Non Patent Literature 3, for example).

Moreover, there is another problem that the accuracy in distance estimation can be maintained only in the case of a relatively small amount of blurring.

A first factor for this problem is as follows. Since the distance is estimated by performing matching in image processing, it may be hard for the distance estimation accuracy to be relatively high when the power is small, that is, when the amount of blurring is large.

A second factor for this problem is as follows. In the case of a blurring model using a real lens (a coupling lens), an amount of change in blurring is likely to be smaller when the amount of blurring is larger. Note that, however, this is not the case for an ideal lens model such as a Gaussian model or a pillbox model. That is, the distance estimation accuracy decreases in a region where the amount of blurring is large and the amount of change in blurring is small.

In regard to this problem, there is an idea that the distance estimation accuracy is low in the case of a normal optical system because a pupil (an aperture) that determines characteristics of blurring is round in shape and thus the amount of change in blurring is small. A method based on this idea has been proposed. This method employs a structured pupil mask to perform distance estimation using a model having a large amount of change in blurring (see Non Patent Literature 4, for example).

The structured pupil mask allows the changes in blurring to be more recognizable in the direction of depth than in the case of the round aperture, thereby increasing the distance estimation accuracy.

Moreover, in addition to that the distance can be estimated, an all-in-focus image can also be generated at the same time.

As a method obtained by further developing this idea, a coded aperture method has also been proposed that performs distance measurement with a higher degree of accuracy for each subregion of an image by further devising the pupil shape (see Non Patent Literature 5, for example).

These methods devising the pupil shape have a problem that, although the distance estimation accuracy increases, the amount of light decreases and the image quality of the all-in-focus image slightly decreases as well.

It should be noted that each of the aforementioned approaches to the problem is based on an idea of increasing the distance estimation accuracy by generating a zero point in frequency transfer characteristics in the entire optical system through devising the pupil shape. More specifically, based on this idea, although robust distance estimation can be achieved regardless of a subject, there is information that has been lost due to the zero point (i.e., a component which is zero in a frequency domain) when the all-in-focus image is to be restored. On this account, this idea has a fundamental problem that the lost information cannot be restored in a subsequent stage of signal processing. The above-mentioned problem occurs due to this.

Approaches to solving the problem include the following method. By using two images captured with different aperture shapes as one pair, this method achieves an increase in the distance estimation accuracy and also prevents a decrease in performance to restore the all-in-focus image. Moreover, a technique using coded aperture pairs according to this method has also been proposed (see Non Patent Literature 6, for example). With this technique, two images of a subject captured with different aperture shapes are expected to advantageously complement each other's zero points.

However, it is difficult to set a pair of aperture shapes with which the captured images always complement each other's zero points at any distance in any optical system.

Moreover, even on a precondition that a specific optical system is to be used, it is still difficult to set a pair of aperture shapes with which the captured images always complement each other's zero points at any distance.

To be more specific, it is harder to avoid a decrease in the image quality of the restored all-in-focus image than in the case of using the normal optical system.

Furthermore, another approach has been disclosed. That is, by firstly obtaining an all-in-focus image and combining the obtained all-in-focus image and an image normally captured subsequently, a distance to a subject is estimated based on a difference in focus between the images (see Non Patent Literature 7 and Patent Literature 1, for example).

A method called "Focal Stack" is one of the well-known conventional techniques. According to this method, plural images having different focal positions are captured, and a region considered to be in focus is extracted from each of the captured images to form, by image synthesis, an extended depth of field (focus) (EDOF) image, i.e., an all-in-focus image.

Distance estimation is performed using the all-in-focus image is obtained as described and one actual image focused at a given distance, such as at a shortest (closest) distance.

A blur parameter in the case where the image is focused at the closest distance is obtained in advance for each subject distance by, for example, measurement. A comparison is made for each region between: each of images obtained from the all-in-focus image by simulating blurring for each subject distance using the aforementioned blur parameter; and the above-mentioned actual image focused at the closest distance. Then, a distance indicated by the most similar image is determined to be the distance of the subject.

A configuration that is necessary to implement this method is described, with reference to FIG. 8.

FIG. 8 is a block diagram showing a configuration of a distance estimation device 9 which estimate a distance using an all-in-focus image and an actual image focused at a specific distance.

The distance estimation device 9 includes an all-in-focus image generation unit 91, a specific-focal-depth image obtaining unit 9101, a blur-parameter-set obtaining unit 9102, a blurred-image-set generation unit 9103, a similar-blurring determination unit 9104, and a distance map generation unit 9105.

The all-in-focus image generation unit 91 generates an all-in-focus image (i.e., an image 91a in FIG. 8).

It should be noted that, as a specific configuration of the all-in-focus image generation unit 91, a configuration used in a method that obtains an all-in-focus image according to an extended depth of field (referred to as "EDOF" hereafter) technology is known. This configuration may be used for the all-in-focus image generation unit 91, for example.

In general, there are mainly five methods as follows.

A first method is called "Focal Stack". According to this method, images having different focal positions are captured, and a focused region is extracted from each of the captured images to form, by image synthesis, an EDOF (extended depth of field) image, i.e., an all-in-focus image.

A second method uniformizes blurring in a direction of depth by inserting an optical element called a phase plate, and performs image restoration processing using a blurred pattern obtained in advance by measurement or simulation. As a result, an EDOF image, i.e., an all-in-focus image is obtained. This method is called "Wavefront Coding" (see Non Patent Literature 8, for example).

A third method convolutes images focused uniformly in a direction of depth (meaning that blurring is uniformized in the direction of depth) by moving a focus lens or an image pickup element during exposure, and performs image restoration processing using a blurred pattern obtained in advance by measurement or simulation. As a result, an EDOF image, i.e., an all-in-focus image is obtained. This method is called "Flexible DOF" (see Non Patent Literature 9, for example).

A fourth method is an approach close to the Focal Stack method. Instead of capturing plural images, this method performs depth estimation or image sharpness detection on one color image using an axial chromatic aberration of the lens. Then, by image processing, an entirely sharp image is obtained as an all-in-focus image (see Non Patent Literature 10, for example).

A fifth method uniformizes blurring in a direction of depth using a multi-focal lens, and performs image restoration processing using a blurred pattern obtained in advance by measurement or simulation. As a result, an all-in-focus image is obtained (see Non Patent Literature 11, for example).

Any of the above five methods can implement the all-in-focus image generation unit 91.

The specific-focal-depth image obtaining unit 9101 selects an arbitrary one image from among a set of images used by the all-in-focus image generation unit 91 in generating the all-in-focus image, or separately captures a new image. By doing so, the specific-focal-depth image obtaining unit 9101 obtains an image (i.e., an image 9101a) focused at a specific depth, namely, a specific distance.

In this way, the specific-focal-depth image obtaining unit 9101 causes a camera to focus at the set specific depth, and thus obtains the image focused at this focal depth.

The blur-parameter-set obtaining unit 9102 reads out recorded blur parameters. To be more specific, a blur parameter (i.e., data 9102a) indicating blurring is numerically recorded in advance for each arbitrary depth (distance) of when the specific-focal-depth image obtaining unit 9101 causes the camera to focus at the set specific depth. This recording process is performed by, for example, the blur-parameter-set obtaining unit 9102. Then, the blur-parameter-set obtaining unit 9102 reads out the blur parameters recorded in this way. Alternatively, when a manner of blurring caused by the lens can be formulated, the blur parameter (the data 9102a) is calculated according to this formula.

The blurred-image-set generation unit 9103 receives the all-in-focus image from the all-in-focus image generation unit 91. The blurred-image-set generation unit 9103 also receives the blur parameter for each arbitrary depth from the blur-parameter-set obtaining unit 9102. Then, the blurred-image-set generation unit 9103 convolutes the blur parameter in the all-in-focus image for each arbitrary depth. This obtained set of images corresponding to the arbitrary depths represents a set of simulated images of when it is hypothesized that all subjects are present in these depths.

The similar-blurring determination unit 9104 makes a comparison between: each of the images corresponding to the arbitrary depths obtained by the blurred-image-set generation unit 9103 (i.e., an image 9103a for each of the depths (distances)); and the actual captured image focused at the specific depth (i.e., the image 9101a) obtained by the specific-focal-depth image obtaining unit 9101. The similar-blurring determination unit 9104 makes this comparison, region by region included in these two images, and determines a degree of similarity in blurring. As a result, it is determined that, region by region, similarity is present between the image (i.e., the image 9103a) at which depth (distance) and the actual captured image (i.e., the image 9101a). To be more specific, an evaluation function is calculated according to Equation 1 as follows.

[Math. 1]

$$Fc(d) = \sum_c (A - F1 * K(d))  \qquad \text{Equation 1}$$

Here, "d" represents a depth (distance), "A" represents a luminance value of the all-in-focus image, "F1" represents a luminance value of the actual captured image focused at the specific depth, "K(d)" represents a blur parameter corresponding to an arbitrary depth, and "Fc(d)" represents an evaluation function. Moreover, "*" in Equation 1 represents a convolution operator. Of these variables, each of "A" and "F1" is a three-dimensional matrix of vertical elements by horizontal elements by color elements of the image. Moreover, "Fc(d)" is a two-dimensional matrix of vertical elements by horizontal elements of the image. Furthermore, the blur parameter K(d) is a three-dimensional matrix having: a square adequate in size to describe changes in blurring; and color. The similar-blurring determination unit 9104 calculates, region by region included in the image, "d" such that the evaluation function is the smallest with respect to the evaluation function "Fc(d)" calculated for each pixel in this way.

The distance map generation unit 9105 maps, on the image, this "d" obtained region by region included in the image as described above, and outputs the resulting map as a distance map.

CITATION LIST

Patent Literature

[PTL 1]
United States Patent Application Publication No. 2007/0019883

Non Patent Literature

[NPL 1]
A. P. Pentland, "A New Sense for Depth of Field", IEEE Trans. PAMI, vol. 9, no. 4, pp. 523-531 (1987)

[NPL 2]
M. Subbarao and G. Surya, "Depth from Defocus: A spatial domain approach", International Journal of Computer Vision, vol. 13, no. 3, pp. 271-294 (1994)

[NPL 3]
M. Watanabe and S. K. Nayar, "Minimal operator set for passive depth from defocus", Proc. Of IEEE Conf. Computer Vision and Pattern Recognition, pp. 431-438 (1996)

[NPL 4]
Shinsaku Hiura and Takashi Matsuyama, "Multi-Focus Range Finder with Coded Aperture", the Institute of Electronics, Information and Communication Engineers Transactions, D-II vol. 382-D-II, no. 11, pp. 1912-1920 (1999)

[NPL 5]
A. Levin, R. Fergus, F. Durand and W. T. Freeman, "Image and Depth from a Conventional Camera with a Coded Aperture", ACM Transactions on Graphics, Vol. 26, No. 3, Article 70, 70-1-70-9 (2007)

[NPL 6]
C. Zhou, S. Lin and S. Nayar, "Coded Aperture Pairs for Depth from Defocus", IEEE International Conference on Computer Vision (ICCV) Sensing II (2009)

[NPL 7]
E. Wong, "A New Method for Creating a Depth Map for Camera Auto Focus Using an All in Focus Picture and 2D Scale Space Matching", Acoustics, Speech and Signal Processing, ICASSP 2006 Proceedings, IEEE International Conference on Vol. 3, III, pp. 1184-1187 (2006)

[NPL 8]
E. R. Dowski and W. T. Cathey, "Extended depth of field through wave-front coding", Applied Optics, Vol. 34, No. 11, P. 1859-1866 (1995)

[NPL 9]
H. Nagahara, S. Kuthirummal, C. Zhou and S. Nayar, "Flexible Depth of Field Photography", European Conference on Computer Vision (ECCV), October 16th, Morning Session 2: Computational Photography (2008)

[NPL 10]
C. Tisse, H. P. Nguyen, R. Tesieres, M. Pyanet and F. Guichard, "Extended Depth-of-field (EDOF) using sharpness transport across colour channels", Optical Engineering+Applications, Part of SPIE Optics+Photonics, Session 1—Imaging in the Optical Design Process: Depth of Field (2008)

[NPL 11]
W. Chi and N. George, "Computational imaging with the logarithmic asphere: theory", Optical Society of America, Vol. 20, No. 12, December (2003)

SUMMARY OF INVENTION

Technical Problem

By generating a distance map as described above, a distance to each of the subjects included in the image can be calculated without any loss in quality of the all-in-focus image.

However, such a conventional approach presupposes a round aperture. On this account, the distance estimation accuracy is usually lower than the case of using a coded aperture or coded aperture pairs. Moreover, the problem still remains that the distance estimation accuracy can be maintained only in the case of a small amount of blurring.

In the above example, when the image is focused at a near distance, the distance estimation accuracy is high around this region and low in a region at a far distance. In actual use, this variation in the distance estimation accuracy is a larger problem.

The present invention is conceived in view of the aforementioned conventional problem and has an object to provide a distance estimation device and a distance estimation method having no variation in the distance estimation accuracy.

Solution to Problem

In order to solve the aforementioned problem, the distance estimation device according to an aspect of the present invention is a distance estimation device including: a first focal-depth image obtaining unit which obtains a first focal-depth image focused at a first focal depth; a second focal-depth image obtaining unit which obtains a second focal-depth image focused at a second focal depth different from the first focal depth; an all-in-focus image generation unit which generates an all-in-focus image focused in a focal range wider than each of a focal range of the first focal-depth image and a focal range of the second focal-depth image; a first generation unit which (i) sets a plurality of focal depths within the focal range of the all-in-focus image, (ii) generates, from the all-in-focus image, a plurality of blurred images which are focused at the first focal depth and blurred at the plurality of focal depths, (iii) selects, for each of image regions included in the first focal-depth image, a blurred image having a sub-image that is most similar to a sub-image in the image region, from among the blurred images at the focal depths, and (iv) generates a first distance map indicating the focal depth of the selected blurred image as a focal distance of the image region; a second generation unit which (i) generates, from the all-in-focus image, a plurality of blurred images which are focused at the second focal depth and blurred at the plurality of focal depths, (ii) selects, for each of image regions included in the second focal-depth image, a blurred image having a sub-image that is most similar to a sub-image in the image region, from among the blurred images at the focal depths, and (iii) generates a second distance map indicating the focal depth of the selected blurred image as a focal distance of the image region; and a distance map synthesis unit which synthesizes the generated first distance map and the generated second distance map to generate a synthetic distance map.

The blurred image is selected in this way. The focal depth of the selected blurred image is estimated to be the focal depth of the current image region. To be more specific, the entire of this blurred image (or, the current image region) is selected as the aforementioned most similar image. Accordingly, the appropriate blurred image whose focal depth is estimated to the focal depth of the image region is selected as described, and thus the appropriate operation is performed. Note that the all-in-focus image refers to an image having a third focal range which is wider than each of the first focal range of the first focal-depth image and the second focal range of the second focal-depth image and which includes both the first focal range and the second focal range.

With this configuration, the first generation unit determines a distance of a first subject located at a first focal depth, using the first focal-depth image and the all-in-focus image. Moreover, the second to generation unit determines a distance of a second subject located at a second focal depth, using the second focal-depth image and the all-in-focus image. Then, the synthetic distance map is generated. More specifically, the accuracy of the distance of the first subject indicated by the generated synthetic distance map is higher than the accuracy of the distance of the first subject determined using the first focal-depth image and the all-in-focus image. Similarly, the accuracy of the distance of the second subject indicated by the generated synthetic distance map is higher than the accuracy of the distance of the second subject determined using the second focal-depth image and the all-in-focus image. In this way, the accuracy of the distance of any subject shown is increased, thereby eliminating the variation in the distance determination accuracy. More specifically, the accuracy of the determined distance of any subject is increased, thereby reliably increasing the determination accuracy.

For example, the generated all-in-focus image may be focused at all focal depths included at least between the first focal depth and the second focal depth, the first generation unit may include: a first blur-parameter-set obtaining unit which obtains a first blur parameter set including blur parameters of when the blurred images are focused at the first focal depth, each of the blur parameters indicating an amount of blurring at a focal depth included at least between the first focal depth and the second focal depth; a first blurred-image-set as generation unit which generates a first blurred-image set including the blurred images at the focal depths, by convoluting, into the generated all-in-focus image, each of the blur parameters corresponding to the focal depths included in the obtained first blur parameter set; a first similar-blurring determination unit which makes a comparison, for each of the image regions, between the obtained first focal-depth image and each of the blurred images at the focal depths included in the generated first blurred-image set, and determines the blurred image having the sub-image that is most similar to the sub-image in the image region; and a first distance map generation unit which generates the first distance map indicating the focal depth of the determined blurred image as the focal distance of the image region, and the second generation unit may include: a second blur-parameter-set obtaining unit which obtains a second blur parameter set including blur parameters of when the blurred images are focused at the second focal depth, each of the blur parameters indicating an amount of blurring at a focal depth included at least between the first focal depth and the second focal depth; a second blurred-image-set generation unit which generates a second blurred-image set including the blurred images at the focal depths, by convoluting, into the generated all-in-focus image, each of the blur parameters corresponding to the focal depths included in the obtained second blur parameter set; a second similar-blurring determination unit which makes a comparison, for each of the image regions, between the obtained second focal-depth image and each of the blurred images at the focal depths included in the generated second blurred-image set, and determine the blurred image having the sub-image that is most similar to the sub-image in the image region; and a second distance map generation unit which generates the second distance map indicating the focal depth of the determined blurred image as the focal distance of the image region.

With this configuration, as compared with the accuracy in the conventional case where distance estimation is performed using only one blurred image, the variation in the distance estimation accuracy can be reduced. More specifically, at any focal depth, the distance estimation accuracy can be maintained at a certain level or higher.

In addition, the configuration can be relatively easily implemented simply by including the first blur-parameter-set obtaining unit or the like into the first generation unit.

For example, preferably, the distance estimation device may further include: a first image characteristic extraction unit which extracts a first image characteristic of the obtained first focal-depth image; and a second image characteristic extraction unit which extracts a second image characteristic of the obtained second focal-depth image, wherein the distance map synthesis unit generates the synthetic distance map, based on the first image characteristic and the second image characteristic.

Moreover, with this configuration, the degree of focus can be estimated based on the image characteristic. Accordingly, an image region having a smaller amount of blurring can be determined on a region-by-region basis. Thus, for generating the final distance map, the distance maps each having a higher degree of distance estimation accuracy can be selected and used in map synthesis.

For example, more preferably, the distance map synthesis unit may include: a first map weighting unit which updates the generated first distance map to an updated first distance map, by multiplying a value corresponding to the generated first distance map by a first weight coefficient determined based on the extracted first image characteristic; a second map weighting unit which updates the generated second distance map to an updated second distance map, by multiplying a value corresponding to the generated second distance map by a second weight coefficient determined based on the extracted second image characteristic; and a distance map addition unit which adds a value corresponding to the updated first distance map and a value corresponding to the updated second distance map, to generate the synthetic distance map.

Furthermore, with this configuration, the degree of focus can be estimated based on the image characteristic. Accordingly, an image region having a smaller amount of blurring can be relatively determined on a region-by-region basis. Thus, the distance map having a higher degree of distance estimation accuracy can be weighted by a larger value and, on this account, the final distance map can also be further increased in the distance estimation accuracy.

It should be noted that the present invention can be implemented, not only as a distance estimation device including the characteristic processing units as described above, but also as a distance estimation method having, as steps, the characteristic processing units included in the distance estimation device. Moreover, the present invention can be implemented as a program causing a computer to execute the characteristic steps included in the distance estimation method. In addition, it should be obvious that such a program can be distributed via a computer-readable nonvolatile recording medium such as a Compact Disc-Read Only Memory (CD-ROM) or via a communication network such as the Internet.

Advantageous Effects of Invention

The present invention is capable of preventing variation in the distance estimation accuracy by calculating distance maps using a plurality of images having different focal positions and synthesizing the distance maps.

A distance can be determined with a high degree of accuracy in any region (see regions 1RF and 1RN in an image 2I shown in FIG. 2B, for example). Therefore, the accuracy of the determined distance is prevented from varying from region to region, and also variation in the accuracy of distance determination performed on the image regions is prevented. This means that the determination accuracy as can be made uniform.

A distance can be determined with a high degree of accuracy in any region. Therefore, the accuracy of the determined distance can be increased with reliability.

DESCRIPTION OF EMBODIMENTS

The following is a description of Embodiments according to the present invention, with reference to the drawings.

Figure 1:
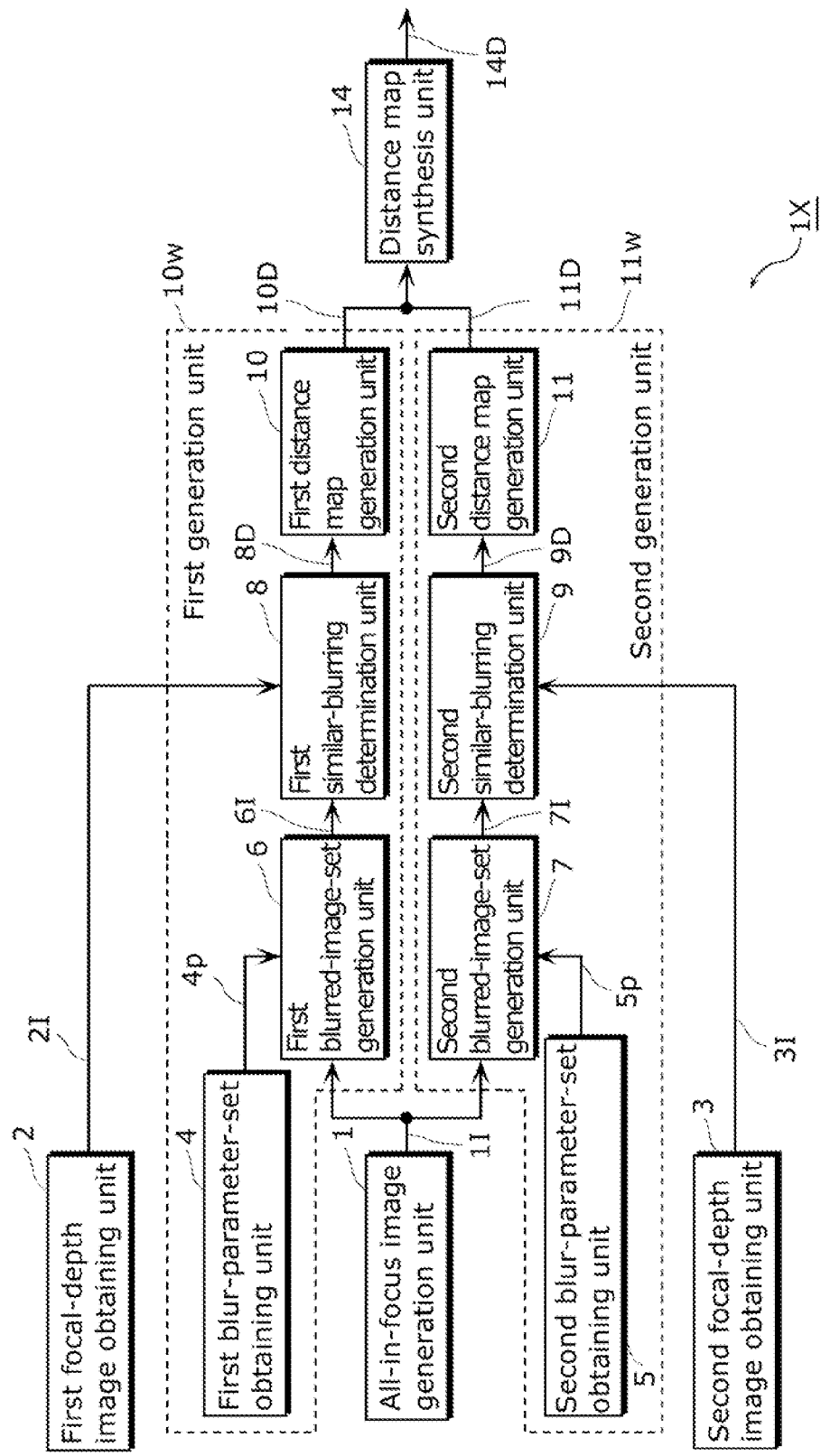
FIG. 1 is a block diagram showing a configuration of a distance estimation device in Embodiment 1 according to the present invention.
Figure 2A:
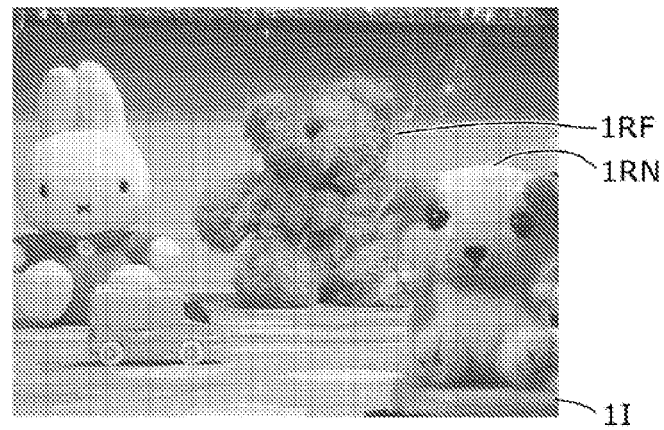
FIG. 2A is a diagram showing an example of an all-in-focus image in Embodiments 1 and 2 according to the present invention.
Figure 2B:
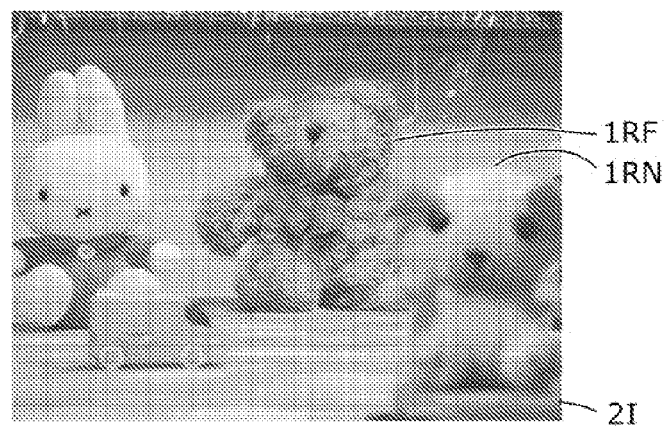
FIG. 2B is a diagram showing an example of a first focal-depth image in Embodiments 1 and 2 according to the present invention.
Figure 9:
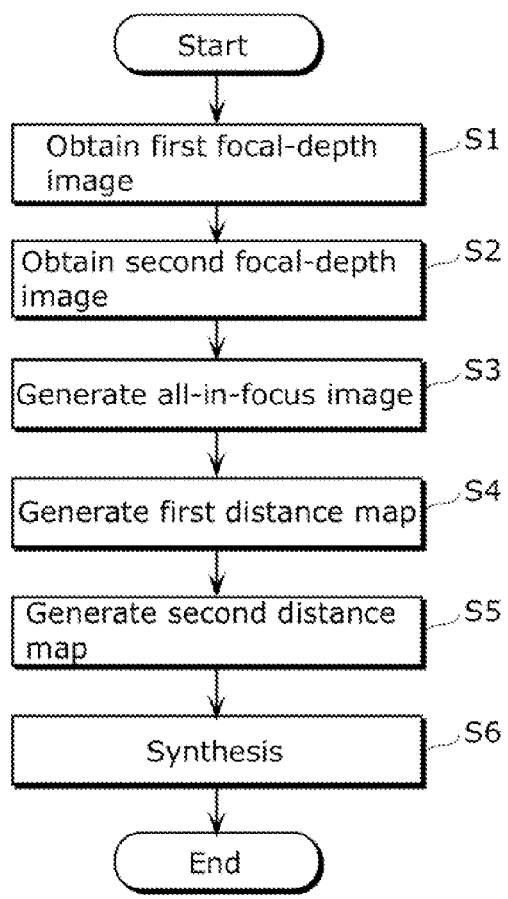
FIG. 9 is a flowchart showing processing performed by the distance estimation device according to the present invention.

A distance estimation device 1x in Embodiment includes a first focal-depth image obtaining unit 2 which obtains a first image 2I (as in FIG. 1 and FIG. 2B) focused at a first focal depth (i.e., a focal depth of a stuffed animal that is located in a region 1RF and is the middle of three stuffed animals in, for example, the image 2I of FIG. 2B) (step S1 in FIG. 9). The distance estimation device 1x also includes a second focal-depth image obtaining unit 3 which obtains a second image 3I (as in FIG. 1 and FIG. 2C) focused at a second focal depth different from the first focal depth (i.e., a focal depth of the stuffed animal located in a region 1RN on the right) (S2). Moreover, the distance estimation device 1x includes an all-in-focus image generation unit 1 which generates an image 1I (as in FIG. 1 and FIG. 2A) that is an all-in-focus image focused in a range wider than each of a focal range of the first image 2I and a focal range of the second image 3I (i.e., focused in a focal range including the focal ranges of the first image 2I and the second image 3I) (S3). Here, a plurality of focal depths are included in the focal range of the generated image 1I (for example, the aforementioned focal range of the image 1I). Furthermore, the distance estimation device 1x includes a first generation unit 10w which: generates, from the image 1I, a plurality of blurred images (a plurality of images 6I) which are focused at the first focal depth (i.e., the focal depth of the region 1RF) and blurred at the plurality of focal depths; selects (or, determined), from among the plurality of blurred images, a blurred image (the image 6I) having a sub-image that is most similar to a sub-image in the current image region (such as the region 1RF) included in the first image 2I; and generates a first distance map (see data 10D (as in FIG. 1 and FIG. 3A)) that indicates the focal depth of the selected blurred image (see data 8D) as a focal distance of the current image region (i.e., the region 1RF) (S4). The distance estimation device 1x also includes a second generation unit 11w which: generates, from the image 1I, a plurality of blurred images (a plurality of images 7I) which are focused at the second focal depth (i.e., the focal depth of the region 1RN) and blurred at the plurality of focal depths; selects, from among the plurality of blurred images, a blurred image having a sub-image that is most similar to a sub-image in the current image region (such as the region 1RN) included in the second image 3I; and generates a second distance map (see data 11D (as in FIG. 1 and FIG. 3B)) that indicates the focal depth of the selected blurred image (see data 9D) as a focal distance of the current image region (i.e., the region 1RN) (S5). Moreover, the distance estimation device 1x includes a distance map synthesis unit 14 which generates a distance map (i.e., a synthetic distance map 14D) by synthesizing the generated first distance map and the generated second distance map (S6). The blurred image is selected in this way. The focal depth of the selected blurred image is estimated to be the focal depth of the current image region. To be more specific, the entire of this blurred image (or, the current image region) is selected as the aforementioned most similar image. Accordingly, the appropriate blurred image whose focal depth is estimated to the focal depth of the image region is selected as described, and thus the appropriate operation is performed.

More specifically, the generated synthetic map indicates a focal distance for each image region. The accuracy of the indicated distance is higher than the lower accuracy of the distance indicated by either the first distance map or the second distance map corresponding to the current image region.

To be more specific, the second image 3I (as in FIG. 1 and FIG. 2C), for example, may be an image focused on a subject (the stuffed animal in the region 1RN on the right) which is not focused in the first image 2I (as in FIG. 1 and FIG. 2B).

Here, a first distance (i.e., the distance determined from the data 8D) refers to the distance of the subject (the stuffed animal on the right) that is determined from the first image 2I and the all-in-focus image 1I. The accuracy of the first distance may be a first accuracy lower than a second accuracy.

Here, a second distance (i.e., the distance determined from the data 9D) refers to the distance of the subject (the stuffed animal on the right) that is determined from the second image 3I and the all-in-focus image 1I. The accuracy of the second distance may be the aforementioned second accuracy which is relatively high.

Then, the first generation unit (10w) may determine the first distance (8D).

The second generation unit (11w) may determine the second distance (9D).

The accuracy of the distance of the aforementioned subject (the stuffed animal in the middle) that is determined from the synthetic distance map (14D) may be equal to or lower than the second accuracy that is relatively high and may be higher than the first accuracy that is relatively low.

In this way, the distance of the subject focused in the first image 2I (namely, the middle stuffed animal in the region 1RF) is not only one that is determined with a high degree of accuracy. That is, the distance of the aforementioned subject which is not focused in the first image 2I (namely, the stuffed animal on the right) is also determined with a high degree of accuracy. Accordingly, the distance of any subject is determined with a high degree of accuracy, and the accuracy of the determined distance cab be increased with reliability.

In other words, the distance of any subject in any image region is determined with a high degree of accuracy. Therefore, the accuracy of the determined distance is prevented from varying from region to region, and also variation in the accuracy of distance determination performed on the image regions is prevented. This means that the determination accuracy can be made uniform.

Furthermore, this can avoid the case where the accuracy of the determined distance varies from region to region and thus a distance map having varying accuracies is generated. Accordingly, the distance map having uniform accuracy without variation (i.e., the distance map as the data 14D in FIG. 1) can be generated.

More specifically, the accuracy of the determined distance can be increased in any region and the distance determination accuracy can be increased more reliably.

The distance estimation device 1x is different from the conventional examples in configuration, operation, and advantageous effect as described.

Embodiment 1

A distance estimation device and a distance estimation method in Embodiment 1 according to the present invention are described, with reference to FIG. 1, FIGS. 2A to 2C, and FIGS. 3A to 3C. It should be noted that since fundamental components are the same between the distance estimation device and the distance estimation method, only the distance estimation device is described as follows.

FIG. 1 is a block diagram showing a configuration of the distance estimation device (the distance estimation device 1x) in Embodiment 1.

The distance estimation device includes an all-in-focus image generation unit 1, a first focal-depth image obtaining unit 2, a first blur-parameter-set obtaining unit 4, a first blurred-image-set generation unit 6, a first similar-blurring determination unit 8, a first distance map generation unit 10, a second focal-depth image obtaining unit 3, a second blur-parameter-set obtaining unit 5, a second blurred-image-set generation unit 7, a second similar-blurring determination unit 9, a second distance map generation unit 11, and a distance map synthesis unit 14.

The all-in-focus image generation unit 1 generates an image (i.e., the image 1I) focused at all the focal depths included at least between the first focal depth and the second focal depth.

Figure 8:
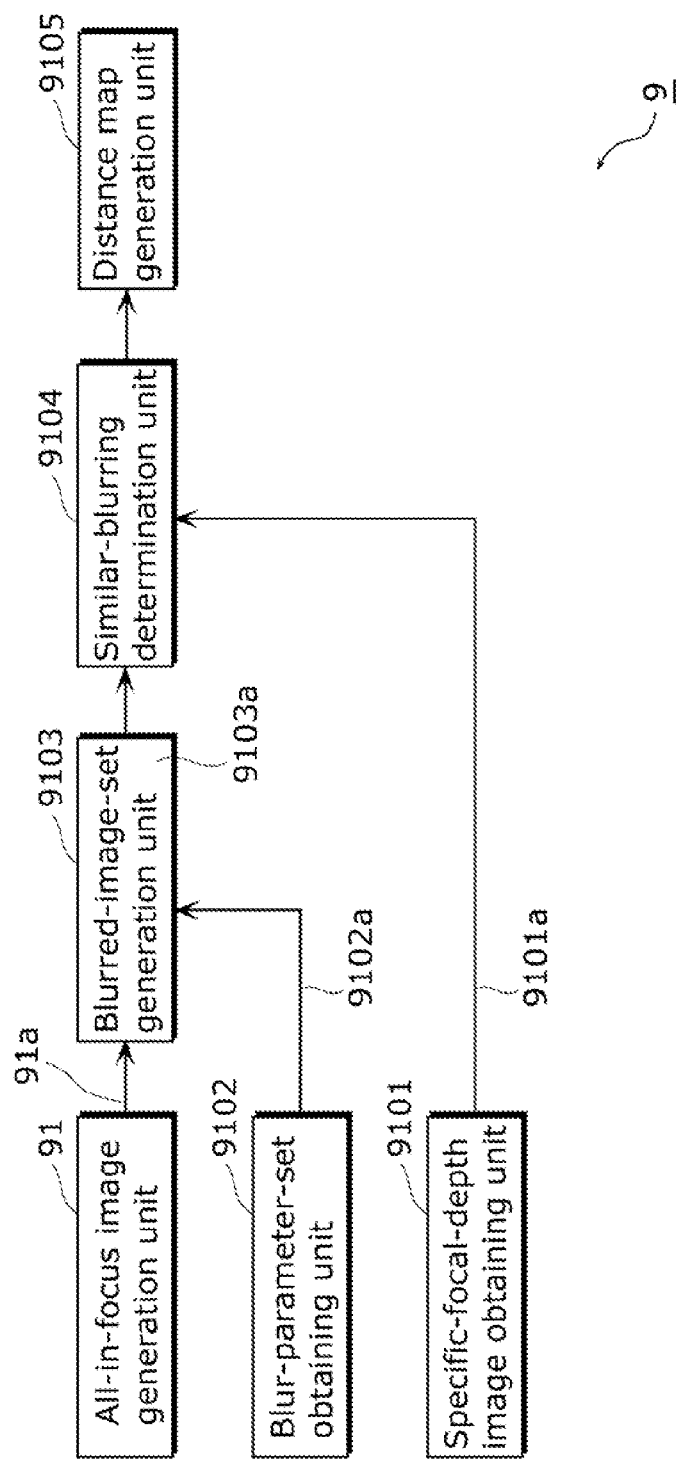
FIG. 8 is a block diagram showing a configuration of a conventional distance estimation device.

It should be noted that a configuration of the all-in-focus image generation unit 1 is based on the configuration of the all-in-focus image generation unit 1 shown in FIG. 8, for example. More specifically, as one example, the all-in-focus image generation unit 1 may use any of the methods including the Focal Stack method, the Wavefront Coding method, the Flexible DOF method, the method using axial chromatic aberration, and the method using multi-focal lens.

The first focal-depth image obtaining unit 2 obtains a first focal-depth image (i.e., the image 2I) focused at the first focal depth.

The second focal-depth image obtaining unit 3 obtains a second focal-depth image (i.e., the image 3I) focused at the second focal depth.

Note that each configuration of the first focal-depth image obtaining unit 2 and the second focal-depth image obtaining unit 3 is based on the configuration of the specific-focal-depth image obtaining unit 9101 shown in FIG. 8, for example.

The first blur-parameter-set obtaining unit 4 obtains a first blur parameter set which is a set of blur parameters (data 4p) of when the blurred images are focused at the first focal depth, each of the blur parameters indicating an amount of blurring at a specific focal depth included at least between the first focal depth and the second focal depth.

The second blur-parameter-set obtaining unit 5 obtains a second blur parameter set which is a set of blur parameters (data 5p) of when the blurred images are focused at the second focal depth, each of the blur parameters indicating an amount of blurring at a specific focal depth included at least between the first focal depth and the second focal depth.

Note that each configuration of the first blur-parameter-set obtaining unit 4 and the second blur-parameter-set obtaining unit 5 is based on the configuration of the blur-parameter-set obtaining unit 9102 shown in FIG. 8, for example.

The first blurred-image-set generation unit 6 generates a first blurred-image set including the blurred images (i.e., the images 6I) at the specific focal depths, by convoluting, into the all-in-focus image (the image 1I) generated by the all-in-focus image generation unit 1, each of the blur parameters corresponding to the specific focal depths included in the first blur parameter set obtained by the first blur-parameter-set obtaining unit 4.

The second blurred-image-set generation unit 7 generates a second blurred-image set including the blurred images (i.e., the images 7I) at the specific focal depths, by convoluting, into the all-in-focus image (the image 1I) generated by the all-in-focus image generation unit 1, each of the blur parameters corresponding to the specific focal depths included in the second blur parameter set obtained by the second blur-parameter-set obtaining unit 5.

Note that each configuration of the first blurred-image-set generation unit 6 and the second blurred-image-set generation unit 7 is based on the configuration of the blurred-image-set generation unit 9103 shown in FIG. 8, for example.

The first similar-blurring determination unit 8 makes a comparison, for each image region, between: the first focal-depth image (i.e., the aforementioned image 2I) obtained by the first focal-depth image obtaining unit 2; and each of the blurred images (i.e., the image 6I) at the specific focal depths included in the first blurred-image set generated by the first blurred-image-set generation unit 6. Then, the first similar-blurring determination unit 8 determines, for each image region, the blurred image that is most similar to the first focal-depth image (i.e., the aforementioned image 2I).

The second similar-blurring determination unit 9 makes a comparison, for each image region, between: the second focal-depth image (i.e., the aforementioned image 3I) obtained by the second focal-depth image obtaining unit 3; and each of the blurred images (i.e., the image 7I) at the specific focal depths included in the second blurred-image set generated by the second blurred-image-set is generation unit 7. Then, the second similar-blurring determination unit 9 determines, for each image region, the blurred image that is most similar to the second focal-depth image (i.e., the aforementioned image 3I).

Note that each configuration of the first similar-blurring determination unit 8 and the second similar-blurring determination unit 9 is based on the configuration of the similar-blurring determination unit 9104 shown in FIG. 8, for example.

The first distance map generation unit 10 generates the first distance map (i.e., the data 10D) indicating, as the focal distance of the current image region, the focal depth of the most similar blurred image (see the data 8D) determined by the first similar-blurring determination unit 8.

The second distance map generation unit 11 generates the second distance map (i.e., the data 11D) indicating, as the focal distance of the current image region, the focal depth of the most similar blurred image (see the data 9D) determined by the second similar-blurring determination unit 9.

Note that each configuration of the first distance map generation unit 10 and the second distance map generation unit 11 is based on the configuration of the distance map generation unit 9105 shown in FIG. 8, for example.

The distance map synthesis unit 14 synthesizes the distance map (the data 10D) outputted from the first distance map generation unit 10 and the distance map (the data 11D) outputted from the second distance map generation unit 11, and then outputs the final distance map (the data 14D). To be more specific, the distance map synthesis unit 14 calculates an average sum of the two distance maps.

FIG. 2A is a diagram showing an example of the all-in-focus image (the image 1I) generated by the all-in-focus image generation unit 1.

FIG. 28 is a diagram showing an example of the first focal-depth image (the image 2I) obtained by the first focal-depth image obtaining unit 2.

Figure 2C:
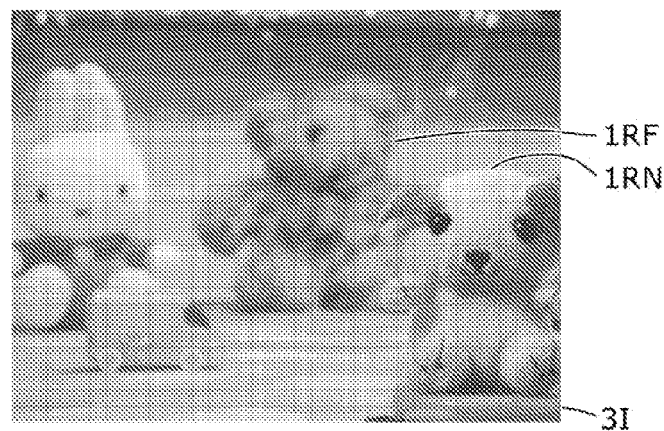
FIG. 2C is a diagram showing an example of a second focal-depth image in Embodiments 1 and 2 according to the present invention.

FIG. 2C is a diagram showing an example of the second focal-depth image (the image 3I) obtained by the second focal-depth image obtaining unit 3.

Note that the first focal depth (i.e., the first distance) is a focal depth (namely, a distance) at which the first focal-depth image (the image 2I in FIG. 2B) is focused. Here, also note that this first focal depth (the first distance) is farther than the second focal depth (i.e., the second distance) that is a focal depth (namely, a distance) at which the second focal-depth image (the image 3I in FIG. 2C) is focused.

Figure 3A:
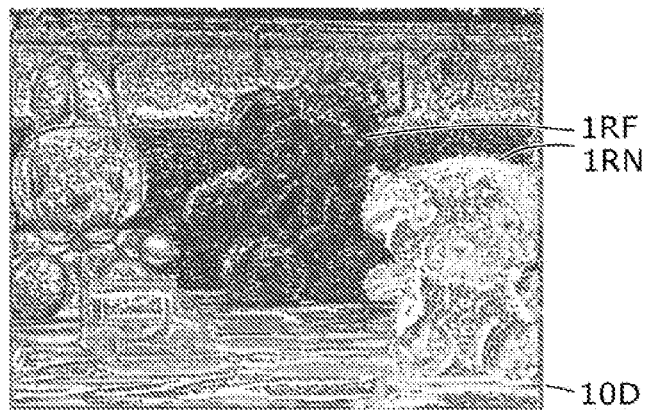
FIG. 3A is a diagram showing an example of a first distance map in Embodiment 1 according to the present invention.
Figure 3B:
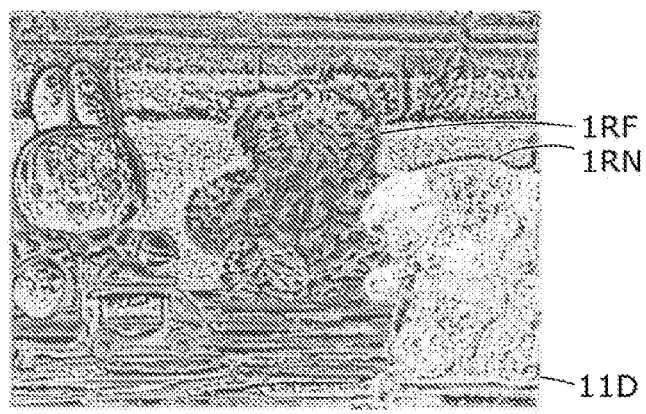
FIG. 3B is a diagram showing an example of a second distance map in Embodiment 1 according to the present invention.

As a result of generating the distance map based on the as aforementioned three images (i.e., the images 1I, 2I, and 3I) shown in FIGS. 2A to 2C, two distance maps (i.e., the distance map as the data 10D and the distance map as the data 11D) shown in FIGS. 3A and 3B are obtained.

FIG. 3A is a diagram showing an example of the first distance map (i.e., the distance map as the data 10D), and FIG. 3B is a diagram showing the second distance map (i.e., the distance map as the data 11D)

Figure 3C:
FIG. 3C is a diagram showing an example of a distance map obtained as a result of synthesis performed by a distance map synthesis unit in Embodiment 1 according to the present invention.

FIG. 3C is a diagram showing an example of the distance map (i.e., the distance map as the data 14D) obtained as a result of synthesis performed on these generated distance maps by the distance map synthesis unit 14.

In the first distance map shown in FIG. 3A, the distance estimation accuracy is relatively high around the stuffed bear (i.e., around the region 1RF) which is the second from the left among the three stuffed animals and which is located farthest.

On the other hand, in the second distance map shown in FIG. 3C, the distance estimation accuracy is relatively high around the stuffed puppy (i.e., around the region 1RN) which is the first from the right and which is located nearest.

That is to say, the distance estimation accuracy can be maintained only in the case of the relatively small amount of blurring (i.e., blurring in the region 1RF of FIG. 2B and blurring in the region 1RN of FIG. 2C) as described earlier. On this account, when the image is focused in the near region (see the region 1RN in FIG. 2C) for example, the distance estimation accuracy is high in this region (see the region 1RN in FIG. 3B) but is low in the far region (see the region 1RF in FIG. 3B);

The distance map shown in FIG. 3C indicates the average sum of the first distance map shown in FIG. 3A and the second distance map shown in FIG. 3B. In the distance map shown in FIG. 3C, these two distance maps shown in FIGS. 3A and 3B compensate for each other's disadvantages. Accordingly, as compared with the estimation accuracy in the case of using the distance maps (i.e., the distance maps shown in FIGS. 3A and 3B) provided before the average sum is calculated, the estimation accuracy in the case of using the distance map shown in FIG. 3C is higher, or more specifically, improved.

According to the configuration in Embodiment 1, errors in distance estimation can be reduced by the advantageous effect achieved by calculating the average of the two distance maps (i.e., the distance map in FIG. 3A and the distance map in FIG. 3B).

Suppose that the first focal depth corresponds to the far end (for example, the focal depth of the region 1RF) and that the second focal depth corresponds to the near end (for example, the focal depth of the region 1RN), as shown in FIGS. 2B and 2C.

In such a case, in the distance map generated by the first distance map generation unit 10 (FIG. 3A), the distance accuracy is high in the far region (i.e., the region 1RF) and is low in the near region (i.e., the region 1RN), as shown in FIGS. 3A and 3B.

Moreover, in the distance map generated by the second distance map generation unit 11 (FIG. 3B), the distance accuracy is high in the near region (i.e., the region 1RN) and is low in the far region (i.e., the region 1RF). By calculating the average, the accuracy can be prevented from decreasing.

Embodiment 2

A distance estimation device and a distance estimation method in Embodiment 2 according to the present invention are described, with reference to FIG. 4, FIGS. 5A to 5C, FIG. 6, and FIG. 7. It should be noted that since fundamental components are the same between the distance estimation device and the distance estimation method, only the distance estimation device is described as follows.

Figure 4:
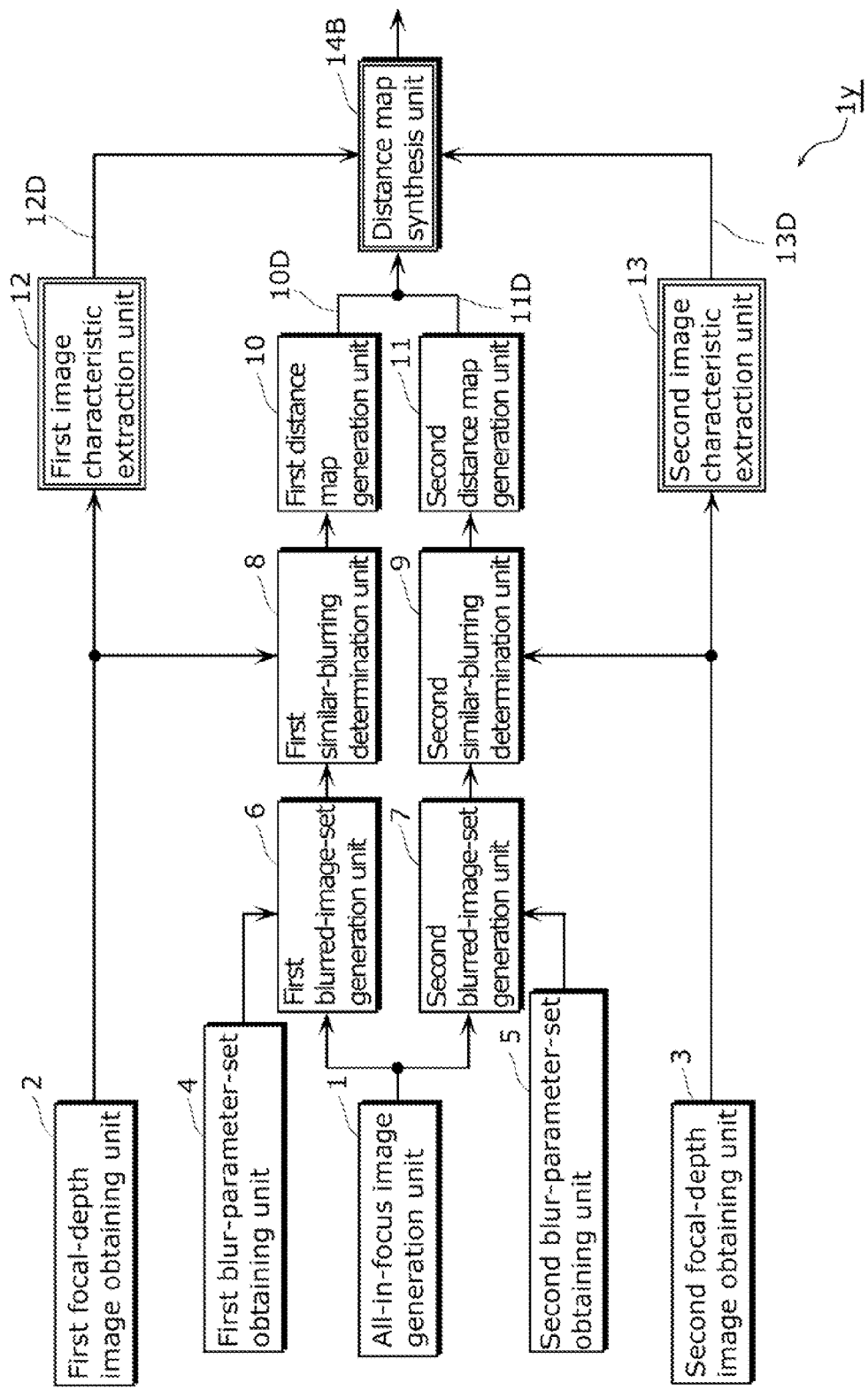
FIG. 4 is a block diagram showing a configuration of a distance estimation device in Embodiment 2 according to the present invention.

FIG. 4 shows the distance estimation device (a distance estimation device 1y) in Embodiment 2. This distance estimation device includes a first image characteristic extraction unit 12 and a second image characteristic extraction unit 13 in addition to the configuration of the distance estimation device shown in FIG. 1 in Embodiment 1. Moreover, the distance estimation device in Embodiment 2 includes a distance map synthesis unit 14B (FIG. 4) in place of the distance map synthesis unit 14 (FIG. 1).

Components assigned with number 1 to 11 are the same as those with these numbers in Embodiment 1.

The first image characteristic extraction unit 12 extracts a first image characteristic from the first focal-depth image (see the image 2I in FIG. 1) obtained by the first focal-depth image obtaining unit 2. For example, data 12D (FIG. 4) indicating the first image characteristic is generated.

The second image characteristic extraction unit 13 extracts a second image characteristic from the second focal-depth image (see the image 3I in FIG. 1) obtained by the second focal-depth image obtaining unit 3. For example, data 13D indicating the second image characteristic is generated.

Here, an image characteristic refers to an amount of characteristic obtained using, for example, a high-pass filter having an arbitrary cutoff frequency in order to extract a high frequency component (namely, edge intensity) from the image.

To be more specific, the amount of characteristic is calculated using an operator classified as a first derivative (luminance gradient), such as a Roberts operator for a diagonal difference or a simple as difference or a Sobel operator. Moreover, operators used as second derivatives include a Laplacian filter.

Furthermore, a template matching method is known whereby some edge standard patterns are prepared to compare with a part of an image and then a pattern having a highest degree of similarity is selected. For example, the Prewitt method is known as such a method.

Moreover, a luminance variance method for calculating a value of luminance variance for a predetermined sub-image can also be used. Here, an appropriate method may be selected from among a number of methods and used in Embodiment 2.

Figure 5A:
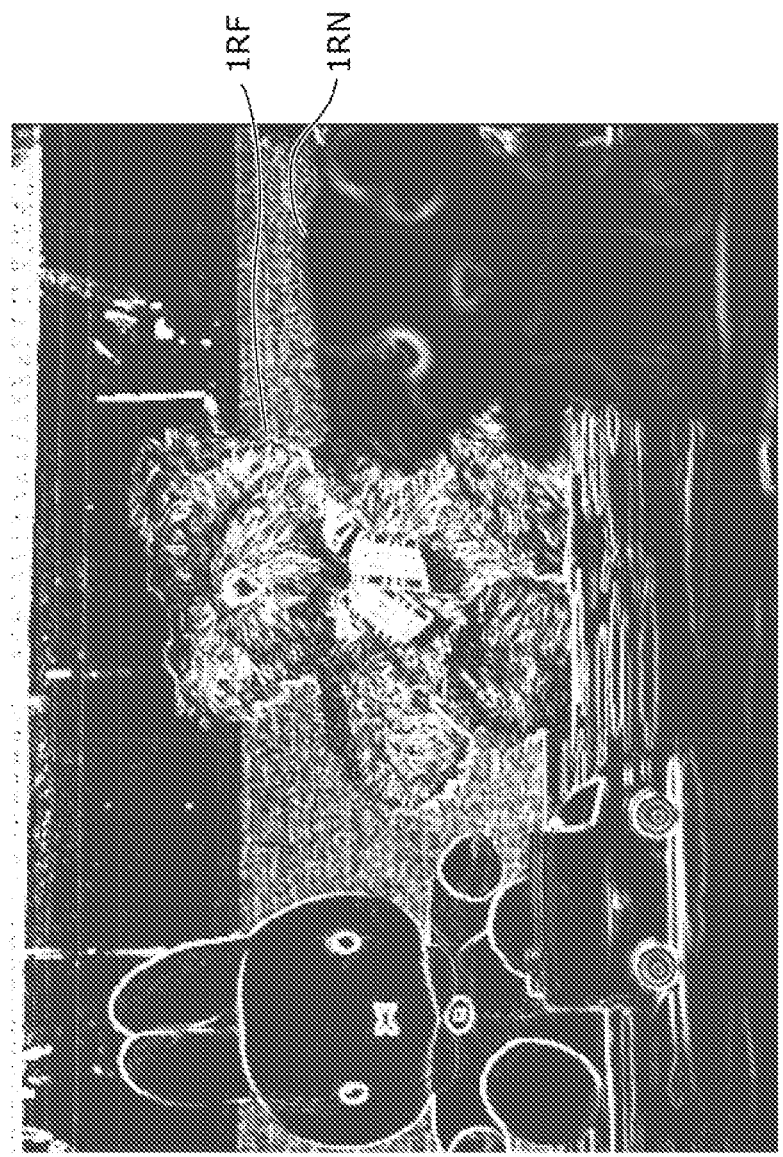
FIG. 5A is a diagram showing an example where edge intensity extraction based on a luminance variance is performed on the first focal-depth image in Embodiment 2 according to the present invention.
Figure 5B:
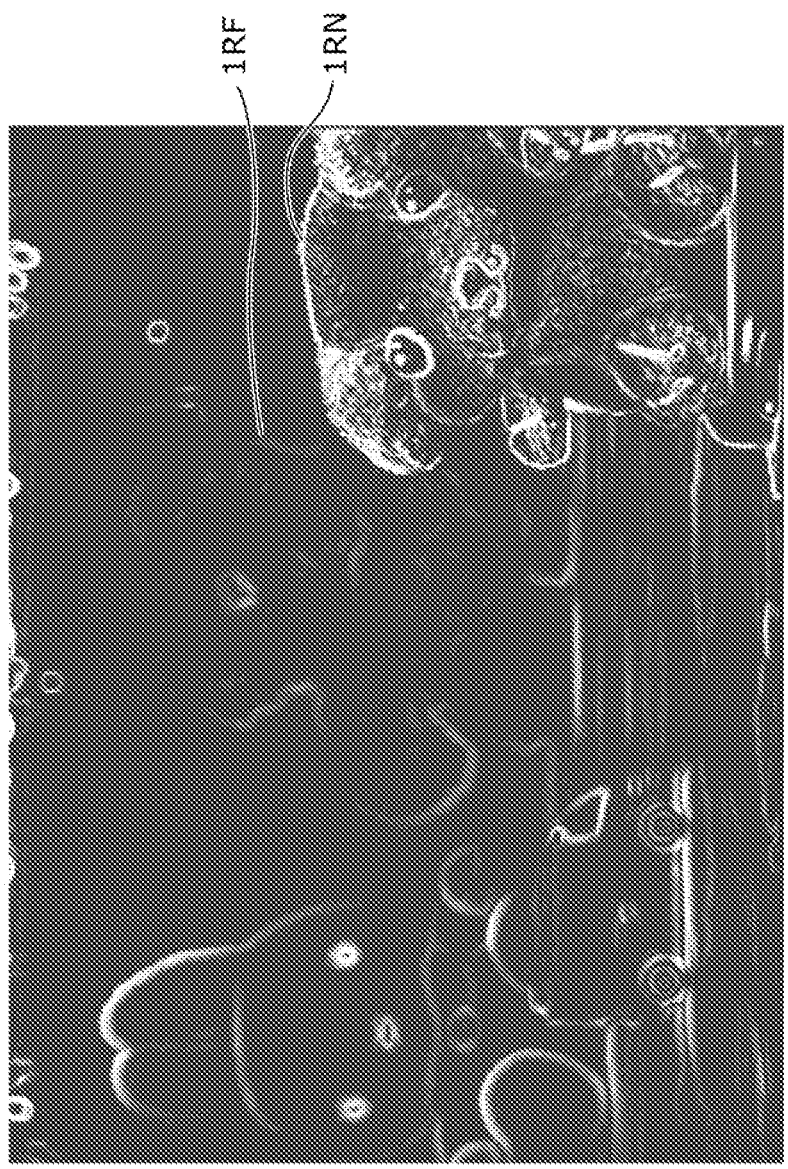
FIG. 5B is a diagram showing an example where edge intensity extraction based on a luminance variance is performed on the second focal-depth image in Embodiment 2 according to the present invention.

FIG. 5A is a diagram showing that edge intensity extraction based on a luminance variance is performed on the first focal-depth image shown in FIG. 2B. FIG. 5B is a diagram showing that edge intensity extraction based on a luminance variance is performed on the second focal-depth image shown in FIG. 2C.

Figure 5C:
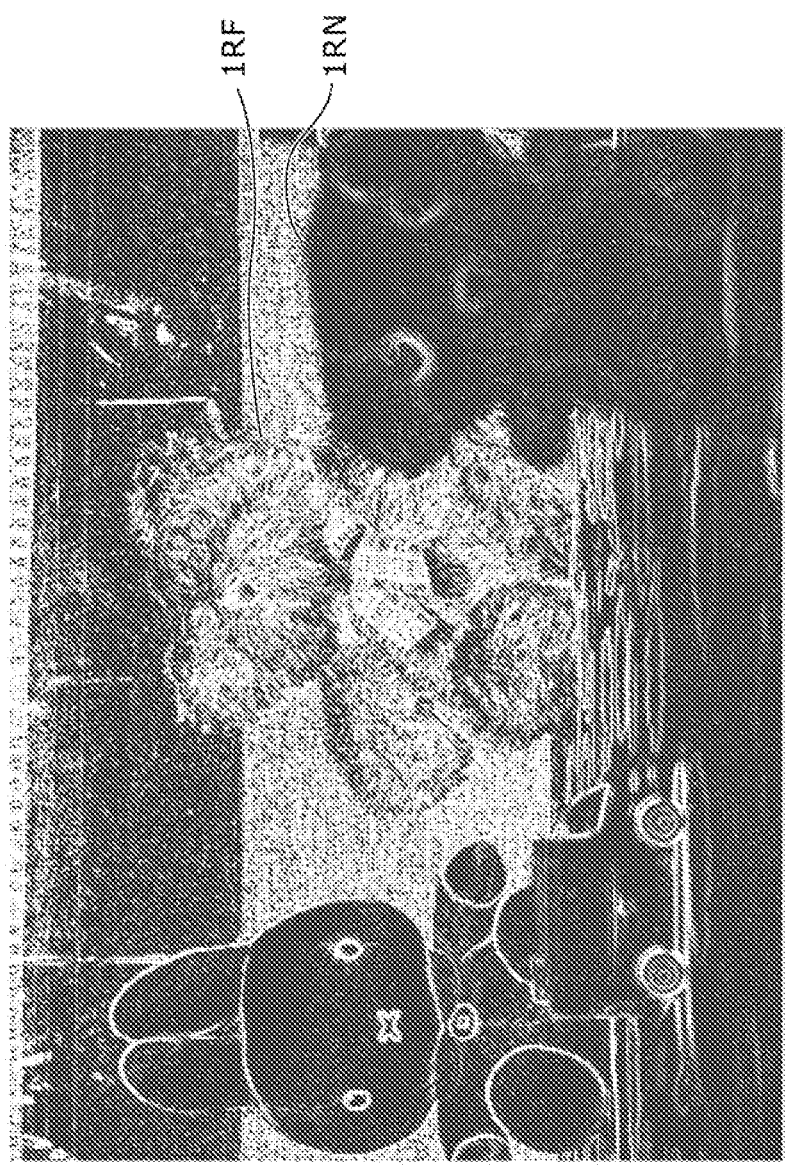
FIG. 5C is a diagram showing an example where edge intensity extraction based on a luminance gradient is performed on the first focal-depth image in Embodiment 2 according to the present invention.
Figure 5D:
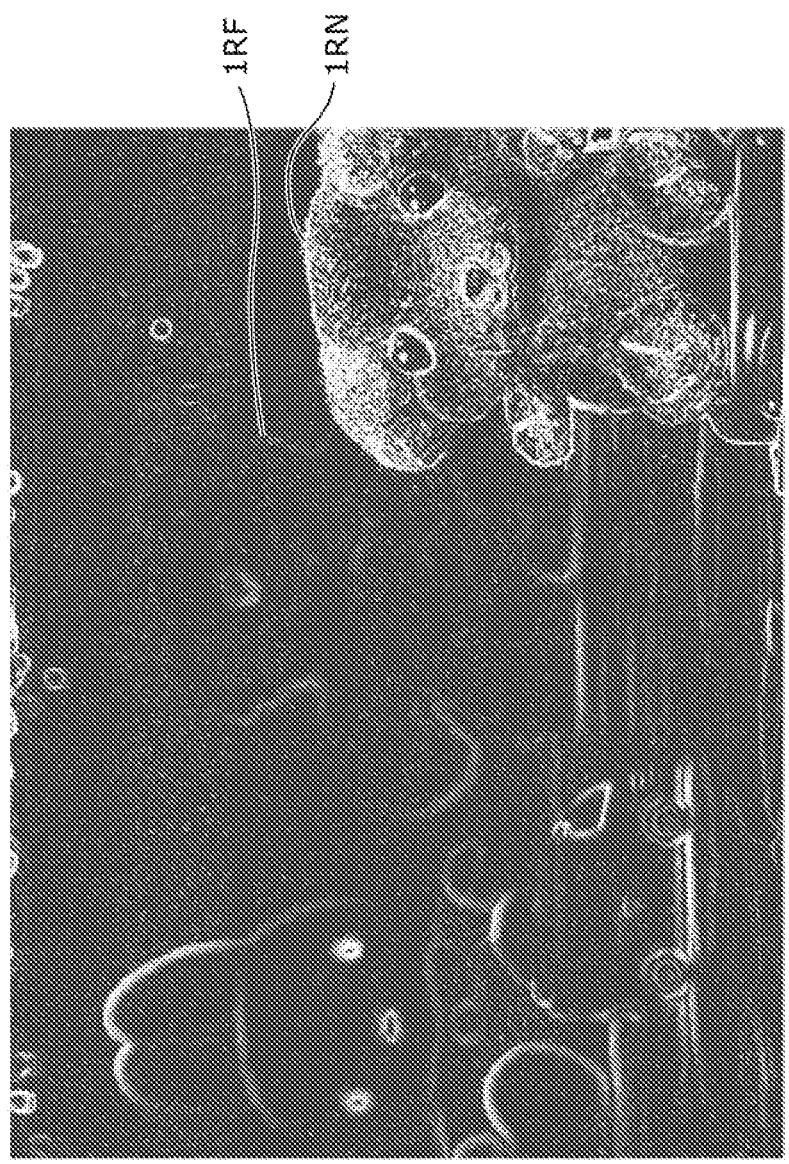
FIG. 5D is a diagram showing an example where edge intensity extraction based on a luminance gradient is performed on the second focal-depth image in Embodiment 2 according to the present invention.

FIG. 5C is a diagram showing that edge intensity extraction based on a luminance gradient is performed on the first focal-depth image shown in FIG. 2B. FIG. 5D is a diagram showing that edge intensity extraction based on a luminance gradient is performed on the second focal-depth image shown in FIG. 2C.

As shown in FIGS. 5A to 5D, when the image is focused at the specific focal depth of the far end (see the region 1RF) (FIGS. 2B, 5A, and 5C), an edge present around the far end located at the focal distance is detected more intensely. In other words, positional information on a subject existing around the far end in the image can be (appropriately) obtained. Moreover, when the image is focused at the specific focal depth of the near end (see the region 1RN) (FIGS. 2C, 5B, and 5D), an edge present around the near end located at the focal distance is detected more intensely. In other words, positional information on a subject existing around the near end in the image can be (appropriately) obtained.

The distance map synthesis unit 14B generates a distance map by synthesizing the first distance map and the second distance map, based on the first image characteristic and the second image characteristic.

Figure 6:
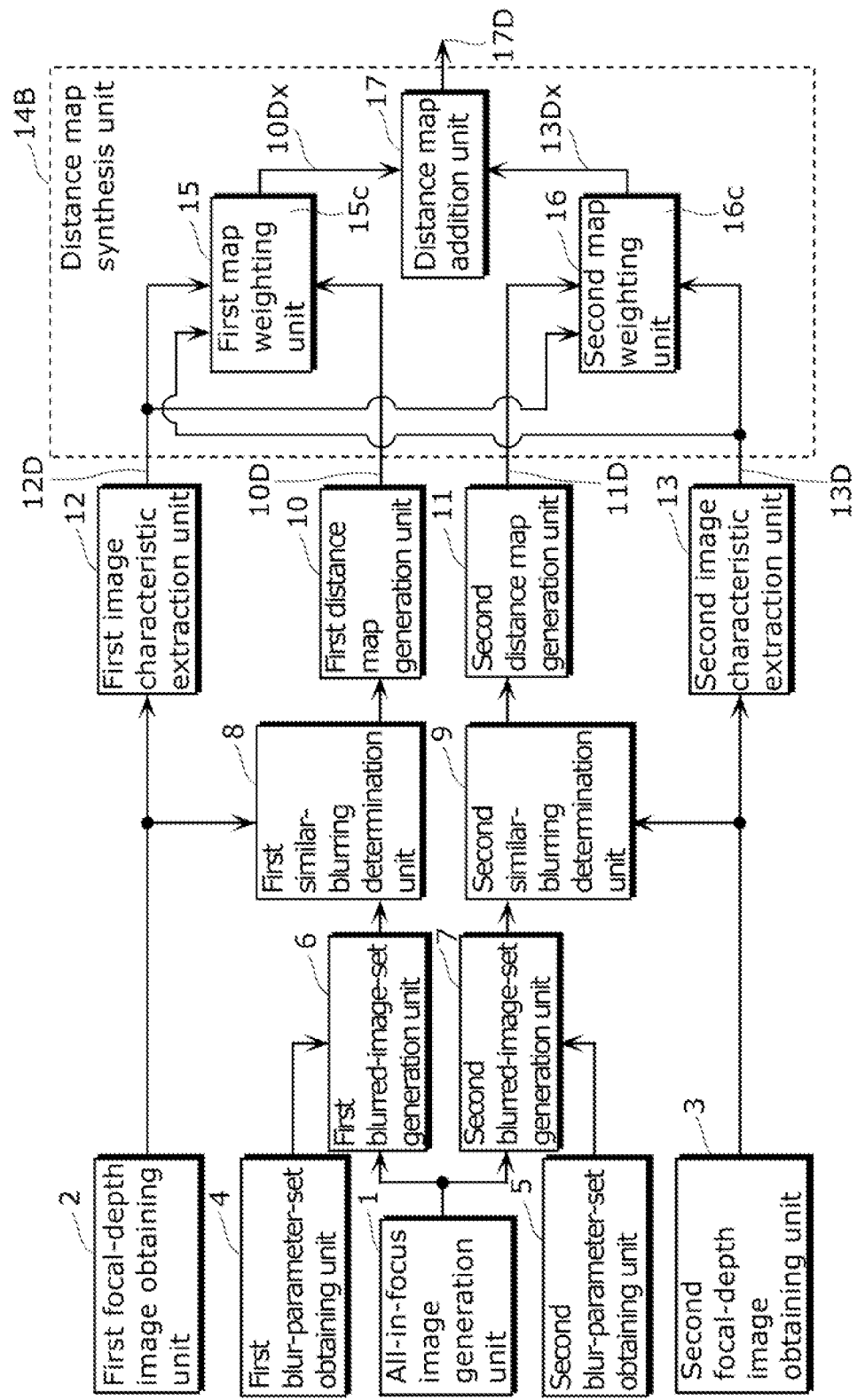
FIG. 6 is a block diagram showing, in detail, a distance map synthesis unit of the distance estimation device in Embodiment 2 according to the present invention.

FIG. 6 is a block diagram showing, in detail, the distance map synthesis unit 14B of the distance estimation device.

The distance map synthesis unit 14B includes a first map weighting unit 15, a second map weighting unit 16, and a distance map addition unit 17.

The first map weighting unit 15 updates the first distance map generated by the first distance map generation unit 10, by multiplying the first distance map by a weight coefficient determined based on the first image characteristic (i.e., the data 12D) extracted by the first image characteristic extraction unit 12. For example, data 10Dx corresponding to the updated first distance map is generated from the data 10D corresponding to the first distance map generated by the first distance map generation unit 10.

The second map weighting unit 16 updates the second distance map generated by the second distance map generation unit 11, by multiplying the second distance map by a weight coefficient determined based on the second image characteristic (i.e., the data 13D) extracted by the second image characteristic extraction unit 13. For example, data 13Dx corresponding to the updated second distance map is generated from the data 11D corresponding to the second distance map generated by the second distance map generation unit 11.

The distance map addition unit 17 generates a synthetic distance map (see data 17D) by adding the updated first distance map (i.e., the data 10Dx) obtained by the first map weighting unit 15 and the updated second distance map (i.e., the data 13Dx) obtained by the second map weighting unit 16.

As described with reference to FIGS. 3A to 3C in Embodiment 1, suppose again that the first focal depth corresponds to the far end and that the second focal depth corresponds to the near end.

In such a case, in the distance map generated by the first distance map generation unit 10, the distance accuracy is high in the far region and is low in the near region.

Moreover, in the distance map generated by the second distance map generation unit 11, the distance accuracy is high in the near region and is low in the far region.

Thus, each of the first map weighting unit 15 and the second map weighting unit 16 calculates a weight coefficient determined based on a ratio of the edge intensity obtained as described above between the edge-extracted image of the far region and the edge-extracted image of the near region.

For example, suppose that an amount of the first image characteristic is "a" and that an amount of the second image characteristic is "b". In this case, the first map weighting unit 15 calculates the weight coefficient as "a/(a+b)", and the second map weighting unit 16 calculates the weight coefficient as "b/(a+b)".

The first map weighting unit 15 updates the first distance map by multiplying the first map by the calculated weight coefficient. The second map weighting unit 16 updates the second distance map by multiplying the second map by the calculated weight coefficient.

The distance map addition unit 17 can finally generate a distance map having a relatively high degree of distance estimation accuracy, by adding the updated first distance map and the updated second distance map.

Figure 7:
FIG. 7 is a diagram showing an example of a distance map obtained as a result of synthesis performed by the distance map synthesis unit in Embodiment 2 according to the present invention.

FIG. 7 is a diagram showing the distance map obtained by the configuration in Embodiment 2

As compared with the distance estimation accuracy in the case of using the distance map obtained by the configuration in Embodiment 1 as shown in FIG. 3C, the distance estimation accuracy is increased for each of the near and far regions in the case of using the distance map shown in FIG. 7.

Note that the following operation, for example, may be performed.

To be more specific, the image (the image 2I in FIG. 1 and FIG. 2B) may be obtained.

Then, the focal depth (the data 8D in FIG. 1) of the subject captured in the obtained image (the stuffed animal which is the middle of the three stuffed animals in, for example, the image 2I of FIG. 2B) may be determined.

More specifically, a blurred image (i.e., the image 6I in FIG. 1) having a corresponding amount of blurring may be generated for each of the plurality of focal depths, from the (all-in-focus) image 1I (FIG. 1 and FIG. 2A) that is focused at all the focal depths.

The focal depth of the blurred image, out of these blurred images, that includes the image of the subject (the middle stuffed animal) and is most similar to the image of the subject (the middle stuffed animal) (i.e., the image in the region 1RF) in the aforementioned image (i.e., the image 2I) that is not focused at all of the focal depths may be determined as the focal depth of the current subject. It should be noted that the whole (or a part) of the blurred image may be the stated most similar image. Then, the focal depth of the blurred image may be determined as the focal depth of the current subject.

However, in addition to a first subject (the middle stuffed animal, for example), a second subject (the right stuffed animal of the three) may be present as another subject.

More specifically, the focal depth of the second subject may be a second focal depth (at a relatively close distance) different from a first focal depth (at a relatively far distance) of the first subject.

Then, as described above, it is possible that while the accuracy of the focal depth of the first subject (the middle stuffed animal) is high, the accuracy of the focal depth of the second subject (the right stuffed animal) is low.

To address this, as described above, not only the first image 2I (in FIG. 2B) is obtained as a normal image (such as the image 2I) that is focused at a specific focal depth instead of all the focal depths (see the first focal-depth image obtaining unit 2 in FIG. 1, for example), the second image 3I (in FIG. 2C) may be obtained as well (see the second focal-depth image obtaining unit 3, for example).

More specifically, the second image 3I focused at the focal depth (i.e., the focal depth of the right stuffed animal) different from the focal depth (i.e., the focal depth of the middle stuffed animal) of the obtained first image 2I may be obtained as well.

Then, the focal depth of the first subject (i.e., the middle stuffed animal) may be determined from the first image 2I (and the image 1I), and the focal depth of the second subject (i.e., the right stuffed animal) may be determined from the second image.

In this way, in spite of the fact that the focal depth of the second subject (i.e., the right stuffed animal) is different from the focal depth of the first image 2I, the focal depth of the second subject is determined from the second image 3I. Accordingly, the focal depth of the second subject (i.e., the right stuffed animal) is determined with a high degree of accuracy (the data 9D in FIG. 1). As a result, the distance can be determined for each of the subjects with a high degree of accuracy, and the accuracy of the determined focal depth (distance) can be increased more reliably.

In other words, the distance can be determined for each of the regions (the regions 1RN and 1RN) with a high degree of accuracy.

Therefore, the accuracy of the determined distance is prevented from varying from subject (or, region) to subject, and variation in the accuracy of distance determination performed on the subjects is also prevented. This means that the determination accuracy is made uniform regardless of the subject (or, region).

It should be noted that, as described above, the focal depth of the first subject (i.e., the middle stuffed animal) is the same as the focal depth of the first image 2I (i.e., the depth corresponding to a far distance).

Moreover, the focal depth of the second subject (i.e., the right stuffed animal) is the same as the focal depth of the second image 3I (i.e., the depth corresponding to a near distance).

On this account, out of the two subjects having the different focal depths, one subject having the same focal depth as the first image 2I (that is, the middle stuffed animal) may be determined as the first subject.

Moreover, out of the two subjects having the different focal depths, the other subject having the same focal depth as the second image 3I (that is, the right stuffed animal) may be determined as the second subject.

Then, out of the focal depth determined from the first image 2I and the focal depth determined from the second image 3I, the focal depth determined from the first image 2I may be determined to indicate a superior depth (i.e., the focal depth having a higher degree of accuracy) of the first subject (the middle stuffed animal).

Thus, the focal depth determined from the second image 3I is determined to indicate a superior depth of the second subject (the right stuffed animal).

Moreover, processing appropriate for the superior focal depth (having the higher degree of accuracy) may be performed on the determined superior focal depth. For example, the weight coefficient (described above) having a relatively large value may be multiplied in the processing that is appropriate.

As a result of the processing performed using the aforementioned weight coefficient, for example, the accuracy of the determined focal depth (see data 17D, for example) can be increased to the accuracy shown in FIG. 7 that is higher than the accuracy shown in FIG. 3C. In this way, the accuracy of the determined focal depth can be increased more adequately.

Moreover, the distance estimation device 1x can determine the superior focal depth, and the user can easily perform an operation without the inconvenience of having to specify the superior focal depth.

It should be noted that the processing of determining the superior focal depth does not need to be performed.

To be more specific, as described above, an average focal depth of the focal depth determined from the first image 2I and the focal depth determined from the second image 3I may be determined, for example (see the distance map synthesis unit 14 in FIG. 1).

In this way, the focal depth that is superior (to some extent), such as the aforementioned average focal depth, may be determined. Here, the superior focal depth is superior to the focal depth which is lower out of the two focal depths determined from the first and second images 2I and 3I, respectively.

Then, the processing appropriate for determining the superior focal depth may be performed on the determined focal depth that is superior (to some extent) (see Embodiment 1 above, for example).

To be more specific, as described above, the synthesis unit (i.e., the distance map synthesis unit 14) may generate the synthetic image (i.e., the data 10D). Here, the generated synthetic image indicates a focal distance for each of at least two image regions (i.e., the regions 1RF and 1RN). Then, the accuracy of each indicated distance is higher than the lower accuracy, out of the accuracies determined for the current image region respectively from the first image 2I and the second image 3I. In other words, the accuracy of the synthetic image is high in any of the image regions, and the accuracy of the indicated distance is reliably high.

It should be noted that a subject having the focal depth that is the same as the focal depth of the image (i.e., the focused subject, such as the middle stuffed animal in the first image 2I) may be determined, for each image (the first image 2I, for example) of the two images (i.e., the first and second images 2I and 3I).

For example, this determination processing may be simply performed according to the conventional method.

To be more specific, as described above, the image of the focused subject (the image of the middle stuffed animal in the image 2I of FIG. 2B, for example) has a relatively sharp quality. On this account, in this image: a relatively large number of edges are shown; the gradient of the edge may be relatively steep; pixels having various luminance values are present; and a value of luminance variance may be relatively large.

In other words, the image in focus is relatively high in contrast.

Thus, as described above, the subject (the middle stuffed animal) in the relatively high contrast image (the image 2I) may be determined as the subject having the focal depth that is the same as the focal depth of the current image.

Then, the focal depth of the subject (in focus) determined in this way from the image (the image 2I) may be determined as the superior focal depth described above.

It should be noted that each of the aforementioned image regions (i.e., the regions 1RF and 1RN) may include at least two pixels or only one pixel, for example.

It should be noted that a single generation unit including specifically both the first generation unit 10w and the second generation unit 11w may be provided.

That is, this single generation unit may perform each of the processing performed for the first image 2I and the processing performed for the second image 3I.

Similarly, note that a single specific-focal-depth image obtaining unit including both the first focal-depth image obtaining unit 2 and the second focal-depth image obtaining unit 3 may be provided. Furthermore, note that a single blurred-image-set generation unit including both the first blurred-image-set generation unit 6 and the second blurred-image-set generation unit 7 may be provided.

The distance estimation device has been described thus far based on Embodiments according to the present invention. However, the present invention is not limited to Embodiments described above.

To be more specific, each of the above-described devices may be configured as, for example, a computer system including a microprocessor, a ROM, a RAM, a hard disk drive, a display unit, a keyboard, and a mouse. The RAM or the hard disk drive stores a computer program. The microprocessor operates according to the computer program, so that a function of each device is carried out. Here, note that the computer program includes a plurality of instruction codes indicating instructions to be given to the computer so as to achieve a specific function.

Moreover, some or all of the components included in each of the above-described devices may be realized as a single system large scale integration (LSI). The system LSI is a super multifunctional LSI manufactured by integrating a plurality of components onto a signal chip. To be more specific, the system LSI is a computer system configured with a microprocessor, a ROM, a RAM, and so forth. The RAM stores a computer program. The microprocessor operates according to the computer program, so that a function of the system LSI is carried out.

Furthermore, some or all of the components included in each of the above-described devices may be implemented as an IC card or a standalone module that can be inserted into and removed from the corresponding device. The IC card or the module is a computer system configured with a microprocessor, a ROM, a RAM, and so forth.

The IC card or the module may include the aforementioned super multifunctional LSI. The microprocessor operates according to the computer program, so that a function of the IC card or the module is carried out. The IC card or the module may be tamper resistant.

Also, the present invention may be the methods described above. Each of the methods may be a computer program implemented by a computer, or may be a digital signal of the computer program.

Moreover, the present invention may be the aforementioned computer program or digital signal recorded onto a computer-readable nonvolatile recording medium, such as a flexible disk, a hard disk, a CD-ROM, an MO, a DVD, a DVD-ROM, a DVD-RAM, a Blu-ray Disc (BD (registered trademark)), and a semiconductor memory. Also, the present invention may be the digital signal recorded onto these nonvolatile recording medium.

Furthermore, the present invention may be the aforementioned computer program or digital signal transmitted via a telecommunication line, a wireless or wired communication line, a network represented by the Internet, and data broadcasting.

Also, the present invention may be a computer system including a microprocessor and a memory. The memory may store the aforementioned computer program and the microprocessor may operate according to the computer program.

Moreover, by transferring the nonvolatile recording medium having the aforementioned program or digital signal recorded thereon or by transferring the aforementioned program or digital signal via the aforementioned network or the like, the present invention may be implemented by an independent different computer system.

Furthermore, the above embodiments and modifications may be combined.

The embodiments disclosed thus far only describe examples in all respects and are not intended to limit the scope of the present invention. It is intended that the scope of the present invention not be limited by the described embodiments, but be defined by the claims set forth below. Meanings equivalent to the description of the claims and all modifications are intended for inclusion within the scope of the following claims.

INDUSTRIAL APPLICABILITY

The distance estimation device and the distance estimation method according to the present invention is capable of preventing the variation in the distance estimation accuracy that has been one of the conventional problems, by performing distance estimation using a plurality of distance maps generated based on images captured at a plurality of focal positions.

These configurations are useful in a field of, for example, image is pickup devices (digital still cameras) for consumer and commercial uses.

The variation in the accuracy of the determined distances can be eliminated.

REFERENCE SIGNS LIST 1 all-in-focus image generation unit
1x distance estimation device
2 first focal-depth image obtaining unit
3 second focal-depth image obtaining unit
4 first blur-parameter-set obtaining unit
5 second blur-parameter-set obtaining unit
6 first blurred-image-set generation unit
7 second blurred-image-set generation unit
8 first similar-blurring determination unit
9 second similar-blurring determination unit
10 first distance map generation unit
10w first generation unit
11 second distance map generation unit
11w second generation unit
12 first image characteristic extraction unit
13 second image characteristic extraction unit
14 distance map synthesis unit
15 first map weighting unit
16 second map weighting unit
17 distance map addition unit
91 all-in-focus image generation unit
9101 specific-focal-depth image obtaining unit
9102 blur-parameter-set obtaining unit
9103 blurred-image-set generation unit
9104 similar-blurring determination unit
9105 distance map generation unit

The invention claimed is:
1. A distance estimation device comprising:
a first focal-depth image obtaining unit configured to obtain a first focal-depth image focused at a first focal depth;
a second focal-depth image obtaining unit configured to obtain a second focal-depth image focused at a second focal depth different from the first focal depth;
an all-in-focus image generation unit configured to generate an all-in-focus image focused in a focal range wider than each of a focal range of the first focal-depth image and a focal range of the second focal-depth image;
a first generation unit configured to (i) set a plurality of focal depths within the focal range of the all-in-focus image, (ii) generate, from the all-in-focus image, a plurality of blurred images which are focused at the first focal depth and blurred at the plurality of focal depths, (iii) select, for each of image regions included in the first focal-depth image, a blurred image having a sub-image that is most similar to a sub-image in the image region, from among the blurred images at the focal depths, and (iv) generate a first distance map indicating the focal depth of the selected blurred image as a focal distance of the image region;
a second generation unit configured to (i) generate, from the all-in-focus image, a plurality of blurred images which are focused at the second focal depth and blurred at the plurality of focal depths, (ii) select, for each of image regions included in the second focal-depth image, a blurred image having a sub-image that is most similar to a sub-image in the image region, from among the blurred images at the focal depths, and (iii) generate a second distance map indicating the focal depth of the selected blurred image as a focal distance of the image region; and
a distance map synthesis unit configured to synthesize the generated first distance map and the generated second distance map to generate a synthetic distance map.
2. The distance estimation device according to claim 1, wherein the generated all-in-focus image is focused at all focal depths included at least between the first focal depth and the second focal depth,
said first generation unit includes:
a first blur-parameter-set obtaining unit configured to obtain a first blur parameter set including blur parameters of when the blurred images are focused at the first focal depth, each of the blur parameters indicating an amount of blurring at a focal depth included at least between the first focal depth and the second focal depth;
a first blurred-image-set generation unit configured to generate a first blurred-image set including the blurred images at the focal depths, by convoluting, into the generated all-in-focus image, each of the blur parameters corresponding to the focal depths included in the obtained first blur parameter set;

a first similar-blurring determination unit configured to make a comparison, for each of the image regions, between the obtained first focal-depth image and each of the blurred images at the focal depths included in the generated first blurred-image set, and determine the blurred image having the sub-image that is most similar to the sub-image in the image region; and a first distance map generation unit configured to generate the first distance map indicating the focal depth of the determined blurred image as the focal distance of the image region, and said second generation unit includes:

a second blur-parameter-set obtaining unit configured to obtain a second blur parameter set including blur parameters of when the blurred images are focused at the second focal depth, each of the blur parameters indicating an amount of blurring at a focal depth included at least between the first focal depth and the second focal depth;

a second blurred-image-set generation unit configured to generate a second blurred-image set including the blurred images at the focal depths, by convoluting, into the generated all-in-focus image, each of the blur parameters corresponding to the focal depths included in the obtained second blur parameter set;

a second similar-blurring determination unit configured to make a comparison, for each of the image regions, between the obtained second focal-depth image and each of the blurred images at the focal depths included in the generated second blurred-image set, and determine the blurred image having the sub-image that is most similar to the sub-image in the image region; and a second distance map generation unit configured to generate the second distance map indicating the focal depth of the determined to blurred image as the focal distance of the image region.

3. The distance estimation device according to claim 1, further comprising:

a first image characteristic extraction unit configured to extract a first image characteristic of the obtained first focal-depth image; and a second image characteristic extraction unit configured to extract a second image characteristic of the obtained second focal-depth image, wherein said distance map synthesis unit is configured to generate the synthetic distance map, based on the first image characteristic and the second image characteristic.

4. The distance estimation device according to claim 3, wherein said distance map synthesis unit includes:

a first map weighting unit configured to update the generated first distance map to an updated first distance map, by multiplying a value corresponding to the generated first distance map by a first weight coefficient determined based on the extracted first image characteristic;

a second map weighting unit configured to update the generated second distance map to an updated second distance map, by multiplying a value corresponding to the generated second distance map by a second weight coefficient determined based on the extracted second image characteristic; and a distance map addition unit configured to add a value corresponding to the updated first distance map and a value corresponding to the updated second distance map, to generate the synthetic distance map.

5. The distance estimation device according to claim 3, wherein the first image characteristic is a contrast of the first focal-depth image, and the second image characteristic is a contrast of the second focal-depth image.

6. The distance estimation device according to claim 3, wherein the first image characteristic is a value of luminance variance of the first focal-depth image, and the second image characteristic is a value of luminance variance of the second focal-depth image.

7. The distance estimation device according to claim 5, wherein said distance map synthesis unit is configured to:

when the contrast is a first contrast that is relatively high, multiply a value of the focal distance determined from one of the first focal-depth image and the second focal-depth image that has the contrast, by a first value that is relatively large as the weight coefficient; and when the contrast is a second contrast that is relatively low, multiply the value of the focal distance by a second value that is relatively small.

8. The distance estimation device according to claim 1, wherein the second focal-depth image is focused on a subject that is not focused in the first focal-depth image, accuracy of a first focal distance of the subject is relatively low, the first focal distance being determined from the first focal-depth image and the all-in-focus image, accuracy of a second focal distance of the subject is relatively high, the second focal distance being determined from the second focal-depth image and the all-in-focus image, said first generation unit is configured to determine the first focal distance, said second generation unit is configured to determine the second focal distance, and accuracy of a focal distance of the subject is equal to or lower than the relatively high accuracy and is higher than the relatively low accuracy, the focal distance being determined from the synthetic distance map.

9. A distance estimation method comprising:

obtaining a first focal-depth image focused at a first focal depth;

obtaining a second focal-depth image focused at a second focal depth different from the first focal depth;

generating an all-in-focus image focused in a focal range wider than each of a focal range of the first focal-depth image and a focal range of the second focal-depth image;

(i) setting a plurality of focal depths within the focal range of the all-in-focus image, (ii) generating, from the all-in-focus image, a plurality of blurred images which are focused at the first focal depth and blurred at the plurality of focal depths, (iii) selecting, for each of image regions included in the first focal-depth image, a blurred image having a sub-image that is most similar to a sub-image in the image region, from among the blurred images at the focal depths, and (iv) generating a first distance map indicating the focal depth of the selected blurred image as a focal distance of the image region;

(i) generating, from the all-in-focus image, a plurality of blurred images which are focused at the second focal depth and blurred at the plurality of focal depths, (ii) selecting, for each of image regions included in the second focal-depth image, a blurred image having a sub-image that is most similar to a sub-image in the image region, from among the blurred images at the focal depths, and (iii) generating a second distance map indicating the focal depth of the selected blurred image as a focal distance of the image region; and synthesizing the generated first distance map and the generated second distance map to generate a synthetic distance map.

10. An integrated circuit comprising:
- a first focal-depth image obtaining unit configured to obtain a first focal-depth image focused at a first focal depth;
- a second focal-depth image obtaining unit configured to obtain a second focal-depth image focused at a second focal depth different from the first focal depth;
- an all-in-focus image generation unit configured to generate an all-in-focus image focused in a focal range wider than each of a focal range of the first focal-depth image and a focal range of the second focal-depth image;
- a first generation unit configured to (i) set a plurality of focal depths within the focal range of the all-in-focus image, (ii) generate, from the all-in-focus image, a plurality of blurred images which are focused at the first focal depth and blurred at the plurality of focal depths, (iii) select, for each of image regions included in the first focal-depth image, a blurred image having a sub-image that is most similar to a sub-image in the image region, from among the blurred images at the focal depths, and (iv) generate a first distance map indicating the focal depth of the selected blurred image as a focal distance of the image region;
- a second generation unit configured to (i) generate, from the all-in-focus image, a plurality of blurred images which are focused at the second focal depth and blurred at the plurality of focal depths, (ii) select, for each of image regions included in the second focal-depth image, a blurred image having a sub-image that is most similar to a sub-image in the image region, from among the blurred images at the focal depths, and (iii) generate a second distance map indicating the focal depth of the selected blurred image as a focal distance of the image region; and
- a distance map synthesis unit configured to synthesize the generated first distance map and the generated second distance map to generate a synthetic distance map.

11. A computer program residing on a non-transitory computer readable medium causing a computer to execute: obtaining a first focal-depth image focused at a first focal depth; obtaining a second focal-depth image focused at a second focal depth different from the first focal depth; generating an all-in-focus image focused in a focal range wider than each of a focal range of the first focal-depth image and a focal range of the second focal-depth image; (i) setting a plurality of focal depths within the focal range of the all-in-focus image, (ii) generating, from the all-in-focus image, a plurality of blurred images which are focused at the first focal depth and blurred at the plurality of focal depths, (iii) selecting, for each of image regions included in the first focal-depth image, a blurred image having a sub-image that is most similar to a sub-image in the image region, from among the blurred images at the focal depths, and (iv) generating a first distance map indicating the focal depth of the selected blurred image as a focal distance of the image region; (i) generating, from the all-in-focus image, a plurality of blurred images which are focused at the second focal depth and blurred at the plurality of focal depths, (ii) selecting, for each of image regions included in the second focal-depth image, a blurred image having a sub-image that is most similar to a sub-image in the image region, from among the blurred images at the focal depths, and (iii) generating a second distance map indicating the focal depth of the selected blurred image as a focal distance of the image region; and synthesizing the generated first distance map and generated second distance map to generate a synthetic distance map.

* * * * *

UNITED STATES PATENT AND TRADEMARK OFFICE
CERTIFICATE OF CORRECTION

PATENT NO.       : 8,705,801 B2
APPLICATION NO.  : 13/390849
DATED            : April 22, 2014
INVENTOR(S)      : Takashi Kawamura Page 1 of 1

It is certified that error appears in the above-identified patent and that said Letters Patent is hereby corrected as shown below:

ON THE TITLE PAGE
Item (30) "Foreign Application Priority Data"

Change "Jun 17, 2012 (JP)………………….2010-138785)" to
-- Jun 17, 2010 (JP)………………….2010-138785) --

Signed and Sealed this
Twelfth Day of August, 2014

Michelle K. Lee
*Deputy Director of the United States Patent and Trademark Office*